US008341261B2

(12) United States Patent
Fuse et al.

(10) Patent No.: US 8,341,261 B2
(45) Date of Patent: Dec. 25, 2012

(54) SERVER DEVICE, INFORMATION REPORT METHOD, AND INFORMATION REPORT SYSTEM

(75) Inventors: Hidetoshi Fuse, Kanagawa (JP); Naoyuki Mochida, Tokyo (JP); Ryutaro Ono, Tokyo (JP)

(73) Assignee: Panasonic Corporation, Osaka (JP)

( * ) Notice: Subject to any disclaimer, the term of this patent is extended or adjusted under 35 U.S.C. 154(b) by 848 days.

(21) Appl. No.: 11/910,499

(22) PCT Filed: Apr. 14, 2006

(86) PCT No.: PCT/JP2006/307912
§ 371 (c)(1),
(2), (4) Date: Oct. 2, 2007

(87) PCT Pub. No.: WO2006/112381
PCT Pub. Date: Oct. 26, 2006

(65) Prior Publication Data
US 2009/0070458 A1    Mar. 12, 2009

(30) Foreign Application Priority Data

Apr. 14, 2005  (JP) ................ 2005-116881
Apr. 14, 2005  (JP) ................ 2005-116882
Apr. 28, 2005  (JP) ................ 2005-132011
May 19, 2005  (JP) ................ 2005-146266

(51) Int. Cl.
*G06F 15/173*    (2006.01)
(52) U.S. Cl. ................... 709/224; 709/223; 709/203
(58) Field of Classification Search ............ 709/203, 709/223, 224
See application file for complete search history.

(56) References Cited

U.S. PATENT DOCUMENTS

| 6,128,644 | A  | * | 10/2000 | Nozaki | ............... 709/203 |
| 6,182,252 | B1 | * | 1/2001 | Wong et al. | ........... 714/708 |
| 2002/0038330 | A1 | * | 3/2002 | Sidi et al. | ............. 709/105 |
| 2002/0087888 | A1 | * | 7/2002 | Yamakawa et al. | ....... 713/201 |

(Continued)

FOREIGN PATENT DOCUMENTS

JP    2000-322365 A    11/2000
(Continued)

OTHER PUBLICATIONS

International Search Report for PCT/JP2006/307912, dated Jul. 18, 2006.

(Continued)

*Primary Examiner* — Wing F Chan
*Assistant Examiner* — Kostas Katsikis
(74) *Attorney, Agent, or Firm* — RatnerPrestia

(57) ABSTRACT

A server device including a management unit for receiving and managing a status of equipment or a user operating the equipment as status information and detecting a load status of the server device from receiving situation of the status information, a notification request receiving unit for receiving a notification request message that requests notification of the status information from a reference person terminal; a notification response transmitting unit for transmitting a notification respond message that responds to the received notification request message; and a status notification transmitting unit for transmitting an information notification message including the status information received by the management unit to the reference person terminal according to the load status. The server device can precisely transmit information from a user device, and the like, to the reference person terminal when the server device is in an overload state.

14 Claims, 24 Drawing Sheets

U.S. PATENT DOCUMENTS

| | | | |
|---|---|---|---|
| 2002/0107910 A1* | 8/2002 | Zhao | 709/203 |
| 2002/0162032 A1* | 10/2002 | Gundersen et al. | 713/300 |
| 2003/0135575 A1* | 7/2003 | Marejka et al. | 709/207 |
| 2003/0135613 A1* | 7/2003 | Yoshida et al. | 709/224 |
| 2004/0158608 A1 | 8/2004 | Friedman | |
| 2004/0205353 A1* | 10/2004 | Catherman et al. | 713/200 |
| 2004/0243703 A1* | 12/2004 | Demmer et al. | 709/224 |
| 2005/0050139 A1* | 3/2005 | Creamer et al. | 709/200 |
| 2005/0071435 A1 | 3/2005 | Karstens | |
| 2005/0228906 A1* | 10/2005 | Kubota | 710/1 |
| 2006/0161708 A1* | 7/2006 | Matsumoto et al. | 710/268 |
| 2006/0188079 A1* | 8/2006 | Tu et al. | 379/210.01 |
| 2010/0023612 A1* | 1/2010 | Yoshida et al. | 709/223 |

FOREIGN PATENT DOCUMENTS

| | | |
|---|---|---|
| JP | 2001-84195 A | 3/2001 |
| JP | 2002-304321 A | 10/2002 |
| JP | 2002-342230 A | 11/2002 |
| JP | 2003-242110 A | 8/2003 |
| JP | 2004-072485 A | 3/2004 |
| JP | 2004-72485 A | 3/2004 |

OTHER PUBLICATIONS

H. Khartabil et al., "Functional Description of Event Notification Filtering", Network Working Group, Request for Comments: 4660, Standards Track, The Internet Society, Sep. 2006.

A. B. Roach et al., "A Session Initiation Protocol (SIP) Event Notification Extension for Resource Lists", Network Working Group, Request for Comments: 4662, Standards Track, The Internet Society, Aug. 2006.

* cited by examiner

FIG. 4

SUBSCRIBE sip : user 105 @ a. com SIP / 2.0
From : sip : client 102 @ a. com
To : sip : user 105 @ a. com
Supported : Notify - Relay

FIG. 5

SIP / 2.0 200 OK
From : sip : client 102 @ a. com
To : sip : user 105 @ a. com
Supported : Notify – Relay : client103 @ a. com

FIG. 6

NOTIFY sip : client 102 @a. com SIP / 2.0
From : sip : user 105 @ a. com
To : sip : client 102 @ a. com
Supported : Notify - Relay <?xml version =1.0 encording = UTF – 8 ?>
present

FIG. 9

NOTIFY sip : client 103 @ a. com SIP / 2.0
From : sip : user 105 @ a. com
To : sip : client 103 @ a. com
Supported : Notify - Relay <?xml version =1.0 encording = UTF – 8 ?>
<user id = user105">
<status>　present </status>
</user>

< user id = "client 102 ">
<status>ON </ status>
</user>

FIG. 17

SUBSCRIBE sip : user 105 @ a.com SIP / 2.0
From : sip : client 102 @ a.com
To : sip : user 105 @ a.com
Event : presence

FIG. 18

SIP / 2.0 200 OK
From : sip : client 102 @ a.com
To : sip : user 105 @ a.com
Event : presence

FIG. 19

NOTIFY sip : client 102 @ a.com SIP / 2.0
From : sip : user 105 @ a.com
To : sip : client 102 @ a.com
Event : presence <?xml version = 1. 0 encoding = UTF – 8 ?>
<status> present < / status>

FIG. 21

| Status information | Priority level |
|---|---|
| Presence information | Priority |
| Location information | Normal |

FIG. 22

| Reference person terminal | Priority level |
|---|---|
| 102 | Priority |
| 103 | Normal |
| 104 | Normal |

FIG. 23

| Information notification terminal | Priority level |
|---|---|
| User device 105 | Priority |
| Information notification terminal 106 | Normal |
| Information notification terminal 107 | Normal |

FIG. 27

```
NOTIFY sip:client102@a. Com SIP/2.0
To:sip:client 102 @a .Com
From:user 105 @a. Com
Event:presence;id=1
Subscription-State:terminated
                    ;reason=probation
                    ;retry-after=5
<?xmlversion=1. 0 encoding=UTF-8?>
<status>present </status>
```

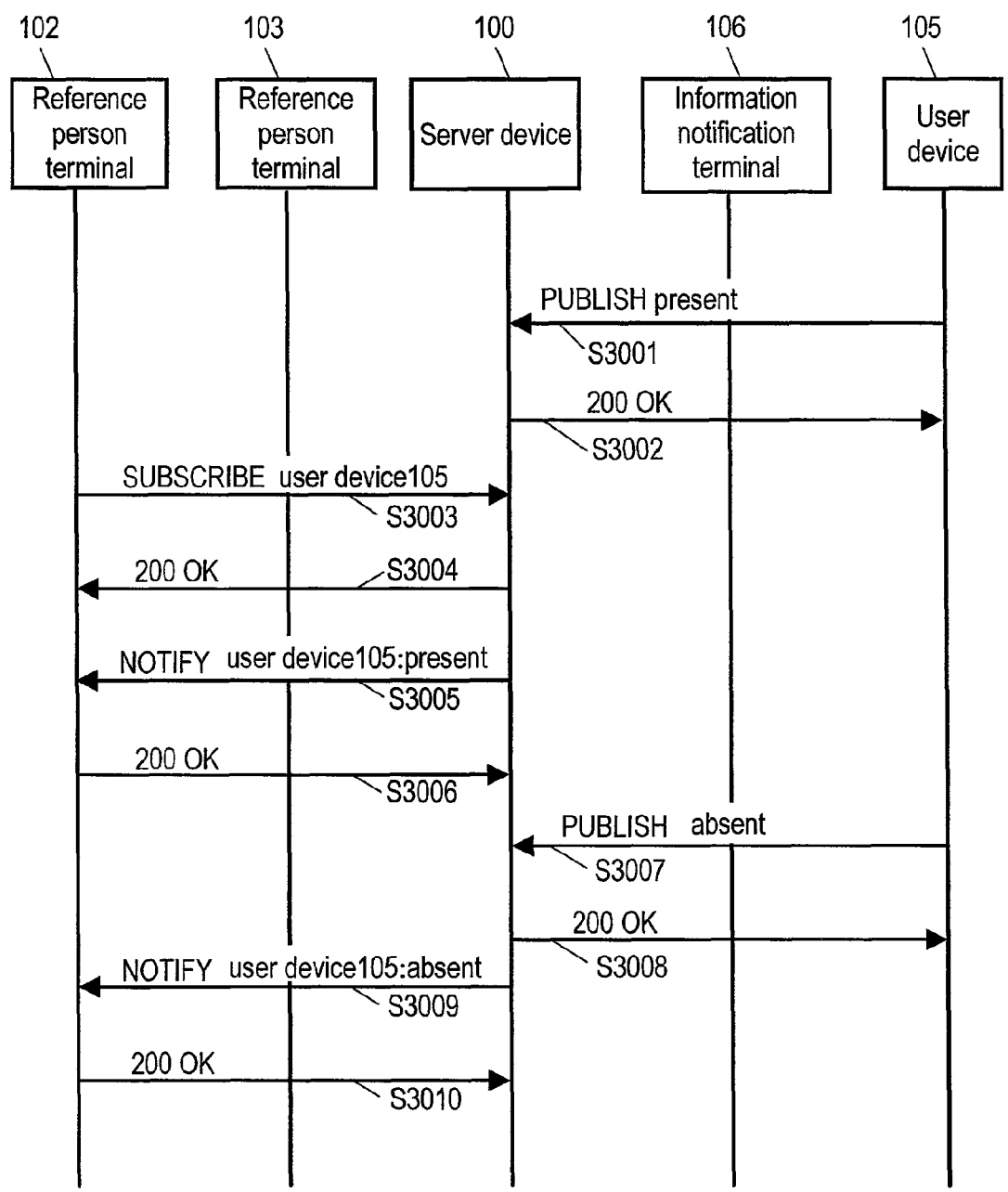

SERVER DEVICE, INFORMATION REPORT METHOD, AND INFORMATION REPORT SYSTEM

This application is a U.S. National Phase Application of PCT International Application PCT/JP2006/307912.

TECHNICAL

The present invention relates to a server device for collecting status information of equipment and the like and notifying a reference person terminal such as a client device of the information, an information notification method, and an information notification system.

BACKGROUND ART

Recently, the Internet has been widely prevalent, and services such as the Internet telephone, an instant message, and the like, are being widely used. One technology for improving the conveniences of such services is a presence service. In the presence service, a server device called a presence server device collects or receives a status of electric equipment or a status of a user as status information through electric equipment that can be communicated to the server device, and notifies a client device that is a reference person terminal wishing to refer to the status information of the status information.

The presence service is disclosed in, for example, Japanese Patent Unexamined Publication No. 2001-84195 (hereinafter, referred to as patent document 1) and Japanese Patent Unexamined Publication No. 2004-72485 (hereinafter, referred to as patent document 2). In many cases of the presence services, a client device receiving status information previously notifies a presence server device by a message and the like that the client device will receive a part of the information held by the presence server device. Then, the client device allows the presence server device to transmit the status information only when the status information is changed.

There are some methods used as specific protocols for realizing the presence service. In the following description, a method using SIP (Session Initiation Protocol) is briefly described.

FIG. 30 is a sequence diagram showing a conventional information notification system for realizing a presence service. In FIG. 30, server device 100 as an information notification relay device is coupled to user device 105 that manages presence information of a user and the like and information notification terminal 106 of electronic equipment and the like, and manages the statuses of user device 105 and information notification terminal 106. When a status of information notification terminal 106 itself is changed (for example, the power supply is turned on/off) and when a status of a user managed by user device 105 is changed (for example, a user is present or absent), information notification terminal 106 and user device 105 obtain status information indicating the status and transmit the information to server device 100 by setting the information in a PUBLISH message of SIP, respectively (S3001). In FIG. 30, user device 105 transmits information indicating the presence of a user to server device 100. Similarly, information notification terminal 106 may transmit information indicating that the power supply is turned on to server device 100. Hereinafter, user device 105 is described.

Herein, user device 105 obtains a status of a user based on, for example, the user's key operation, or obtains a status of a user by using a sensor without operation.

Server device 100 stores and holds the received status information in a memory and the like, and transmits a response message "200 OK" as a response message to information notification terminal 106 that has transmitted a message (S3002).

On the other hand, when reference person terminal 102 that is a client device wants to know the status information of user device 105, reference person terminal 102 transmits a SUBSCRIBE message specifying the status information of user device 105 to server device 100 (S3003). When server device 100 receives the SUBSCRIBE message, it transmits a response message "200 OK" to reference person terminal 102 (S3004) and transmits a NOTIFY message of SIP setting the previously held status information of user device 105 (user device 105: present) to reference person terminal 102 (S3005). When reference person terminal 102 receives the NOTIFY message setting the status information, it displays the message on a display and transmits a response message "200 OK" to server device 100 (S3006).

Then, when the status of user device 105 is changed, for example, a user managed by user device 105 becomes absent, this information is set in a PUBLISH message of SIP and transmitted to server device 100 (S3007). When server device 100 receives the PUBLISH message, it stores and holds the PUBLISH message in a memory and the like and transmits a response message "200 OK" to user device 105 (S3008).

Thereafter, server device 100 sets the status information of user device 105 (for example, user 105: absent), which was previously stored and held, in a NOTIFY message of SIP and transmits it to reference person terminal 102 (S3009). When reference person terminal 102 receives the NOTIFY message, it displays the received message on a display and transmits a response message "200 OK" to server device 100 (S3010). Thus, a series of operations are terminated.

Similarly, when reference person terminal 103 wants to know the status information of user device 105 or information notification terminal 106, the above-mentioned procedure is executed.

Thus, in a conventional information notification system, when reference person terminal 102 wants to know the status information of information notification terminal 106 and user device 105, or when the status information of information notification terminal 106 and user device 105 is changed, the status information of information notification terminal 106 and user device 105 can be obtained from server device 100, respectively, and can be displayed on a display.

However, in a conventional information notification system, when the number of reference person terminals 102 receiving notification from server device 100 is increased, or the number of information notification terminals 106 and user devices 105 managed by server device 100 is increased, it is thought that the status updating frequency of information notification terminal 106 and user device 105 is increased and the traffic with respect to the notification of the status information is increased. Due to this increase of the traffic, load to server device 100 is extremely increased and may exceed the processing performance of server device 100 depending upon the load level. Consequently, not all of the status information from information notification terminal 106 and user device 105 can be processed. Furthermore, the notification of the status information to reference person terminal 102 may not be carried out satisfactorily.

In particular, in a presence service, remarkably many status changes may occur for a short time, for example, a plurality of users managed by user device 105 attend the same meeting or all users leave for lunch during the lunch break. In such a case, even if server device 100 holds a sufficient processing performance on average, many status notifications from information notification terminal 106 are generated for an extremely short time, which may exceed the processing performance of server device 100. As a result, status notifications may be discarded.

Furthermore, even if status notification is not discarded, the processing of status notification may be extremely delayed. When server device 100 functions as a server device for another service, the quality of the other service may be deteriorated.

Then, in order to dissolve such problems, for example, patent document 2 discloses that when information notification occurs from a plurality of information notification terminals 106, such pieces of information are gathered and transmitted to reference person terminal 102 at a time.

However, since the information notification system described in patent document 2 gathers a plurality of pieces of status information and transmits them to reference person terminal 102 at a time, reference person terminal 102 needs a specific program capable of interpreting the gathered status information. Therefore, such functions must be mounted in all reference person terminals 102.

Furthermore, in the information notification system described in patent document 2, only when a plurality of status notifications are transmitted with respect to the same reference person terminal 102, the number of status notifications to be transmitted by server device 100 can be reduced. When a large number of reference person terminals 102 receive status information transmitted from information notification terminal 106, the effect of reducing the load to server device 100 cannot be obtained. Then, there remains a problem that status notification may be considerably delayed or discarded.

Furthermore, the information notification system described in patent document 2 employs a method of gathering a plurality of pieces of status information and transmitting them to reference person terminal 102 at a time according to the regular updating timing of status information. Thus, the notification to reference person terminal 102 may be delayed until the regular update of status information is carried out.

Furthermore, in the information notification system described in patent document 2, the numbers of information notification terminals, reference person terminals and pieces of information to be referred to are increased, and burst-like traffic of information notifications occurs, thus increasing a load to a server device. To solve this increase in the load to the server device, the following method is thought, that is, hardware specification of server device 100 is improved, or a plurality of server devices 100 are provided and the load is distributed to the plurality of server devices 100. However, in such methods, a configuration of the entire system becomes complicated and the cost of the entire system is increased.

SUMMARY OF THE INVENTION

The present invention addresses the problems discussed above, and aims to provide a server device, an information notification method and an information notification system, in which even when a large load is applied to a server device, information from a user and an information notification terminal can be transmitted to a reference person terminal precisely without causing delay or discard and without gathering information, so that therefore, individual reference person terminals do not need a function of interpreting the gathered status information, and it is not necessary that load should be distributed in a plurality of server devices.

The server device of the present invention has a configuration including: a management unit for receiving and managing a status of equipment or a user operating the equipment as status information, and detecting a load status of a server device from a received situation of the status information; a notification request receiving unit for receiving a notification request message from a reference person terminal requesting a notification of the status information; a notification response transmitting unit for transmitting notification response message responding to the received notification request message; and a status notification transmitting unit for transmitting a status notification message including the status information received by the management unit to the reference person terminal, in which the status notification message is limited according to the load status.

With this configuration, even if a large load is applied to the server device, a status notification transmission control unit transmits a status notification message including status information collected by the management unit in a way in which the status notification message is limited. Therefore, the status information can be transmitted to the reference person terminal precisely without causing delay or discard and without gathering information.

BRIEF DESCRIPTION OF THE DRAWINGS

FIG. 4 is a view showing an example of a message format by SIP of the information notification system in accordance with the first exemplary embodiment of the present invention.

FIG. 5 is a view showing another example of a message format by SIP of the information notification system in accordance with the first exemplary embodiment of the present invention.

FIG. 6 is a view showing a further example of a message format by SIP of the information notification system in accordance with the first exemplary embodiment of the present invention.

FIG. 9 is a view showing an example of a message format by SIP of an information notification system in accordance with a third exemplary embodiment of the present invention.

FIG. 17 is a view showing an example of a message format by SIP of the information notification system in accordance with the eighth exemplary embodiment of the present invention.

FIG. 18 is a view showing another example of a message format by SIP of the information notification system in accordance with the eighth exemplary embodiment of the present invention.

FIG. 19 is a view showing a further example of a message format by SIP of the information notification system in accordance with the eighth exemplary embodiment of the present invention.

FIG. 21 is a view showing an example of management information used in the information notification system in accordance with the ninth exemplary embodiment of the present invention.

FIG. 22 is a view showing an example of management information used in an information notification system in accordance with a tenth exemplary embodiment of the present invention.

FIG. 23 is a view showing an example of management information used in an information notification system in accordance with an eleventh exemplary embodiment of the present invention.

FIG. 27 is a view showing an example of a message format by SIP of the information notification system in accordance with the thirteenth exemplary embodiment of the present invention.

FIG. 30 is a sequence diagram showing an operation of a conventional information notification system.

Figure 1:
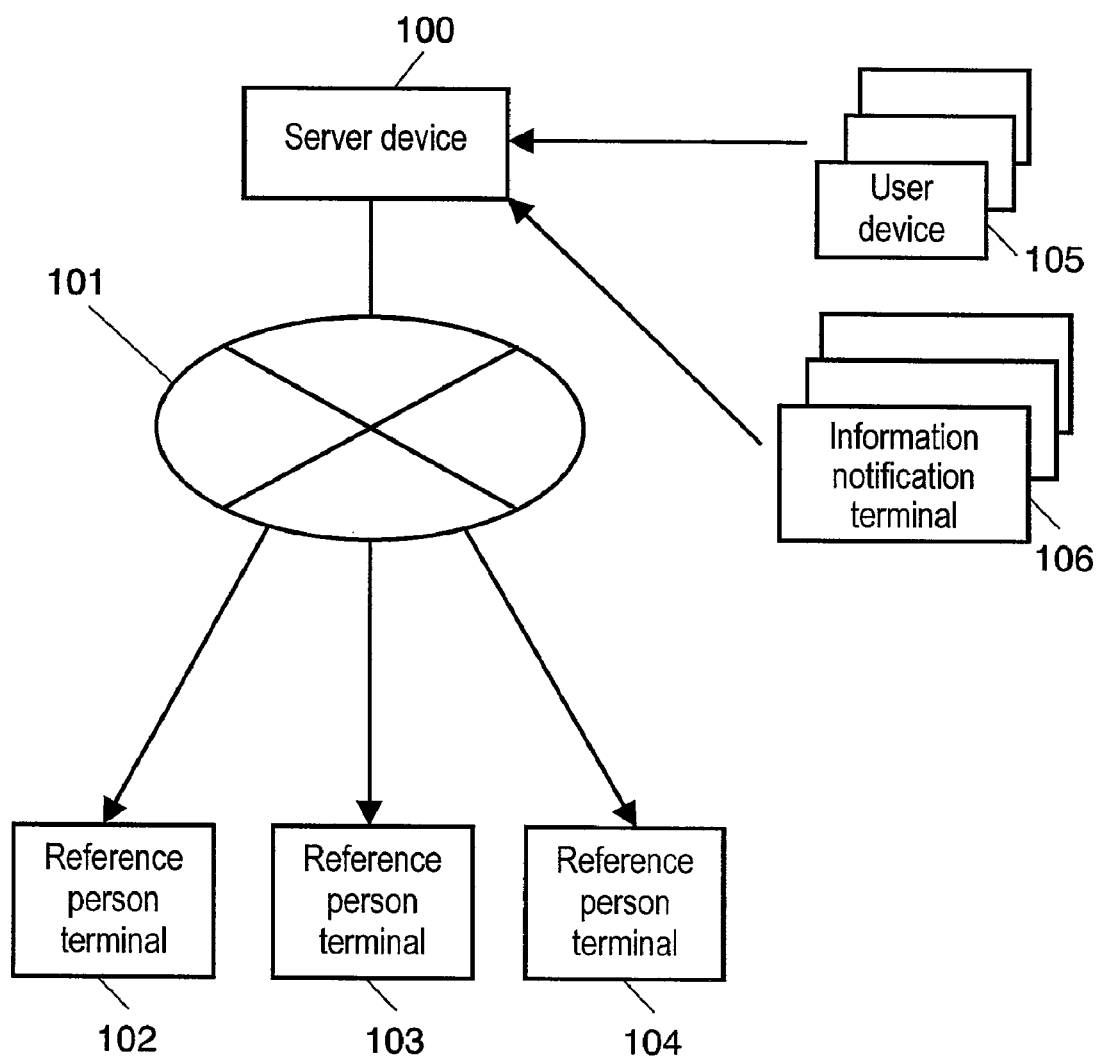
FIG. 1 is a view showing a schematic configuration of an information notification system in accordance with a first exemplary embodiment of the present invention.

REFERENCE MARKS IN THE DRAWINGS 100 server device
101 network
102, 103, 104 reference person terminal
105 user
106, 107, 108 information notification terminal
1001 management unit
1002 notification request receiving unit
1003 notification response transmitting unit
1004 status notification transmitting unit
1005 relay reference person terminal holding unit
1021 notification request transmitting unit
1022 notification response receiving unit
1023 status notification receiving unit
1024 status notification relay unit
1025 notification request receiving unit
2001 information detecting unit
2002 specified time determination unit
2003 information integrating unit

DETAILED DESCRIPTION OF THE PRE ERR EMBODIMENTS

Hereinafter, exemplary embodiments of the present invention are described with reference to drawings.

First Exemplary Embodiment

FIG. 1 is a view showing a schematic configuration of an information notification system in accordance with a first exemplary embodiment of the present invention.

In FIG. 1, server device 100 as an information notification relay device receives a notification of a status such as presence information, location information of a user, and the like, from a device for managing a presence status of a user and the like (hereinafter, referred to as a user device) 105, or a notification of a status of whether the power supply is turned on or off from information notification terminal 106. Then, server device 100 collects and manages the statuses of sever device 105 and information notification terminal 106, and makes a notification of notification information including these statuses.

Furthermore, reference person terminals 102, 103 and 104 as information reference units referring to notification information from user device 105 and information notification terminal 106 are coupled to server device 100 via network 101.

As server device 100, various server devices including a server device of the Internet telephone, a server device for delivering pictures, and the like, can be used. Furthermore, as reference person terminals 102, 103 and 104, various terminals of a personal computer, a general telephone, a portable telephone, Internet-related household electrical appliance, and the like, and other terminal devices can be appropriately used. In particular, server device 100 is not necessarily limited to the above-mentioned various server devices and any devices may be used as long as they have a function of information notification such as status notification. For example, it may be mounted on information notification terminal 106 that is an information notification unit.

Network 101 may be a LAN or a home network besides a public network such as the Internet or a telephone network.

The status information of user device 105 and information notification terminal 106 is managed by server device 100, respectively. Information of the status of user device 105 may be transmitted to server device 100 by user's key operation of user device 105. However, the status of whether a user is present or absent may be directly monitored by providing server device 100 with a sensor such as a human sensor. Furthermore, user device 105 and information notification terminal 106 may be coupled to server device 100 via a network, but they may be integrated with server device 100 so that a user operates server device 100 directly, or server device 100 itself may function as information notification terminal 106.

Furthermore, user device 105 and information notification terminal 106 are configured so as to notify server device 100 of the notification information such as status information of user device 105 and information notification terminal 106. However, on the contrary, server device 100 itself may be configured so as to obtain the status information and the like from user device 105 and information notification terminal 106.

Furthermore, the statuses of user device 105 and information notification terminal 106 may include statuses of services or functions provided by user device 105 and information notification terminal 106. When the information notification terminal is, for example, a portable telephone, the status of the information notification terminal can include a status of radio wave, a status of whether the power supply is turned on or off, a status of working of hardware, a status of a manner mode, and the like.

Next, processing between devices is described in detail with respect to an information notification system in accordance with the first exemplary embodiment.

Figure 2:
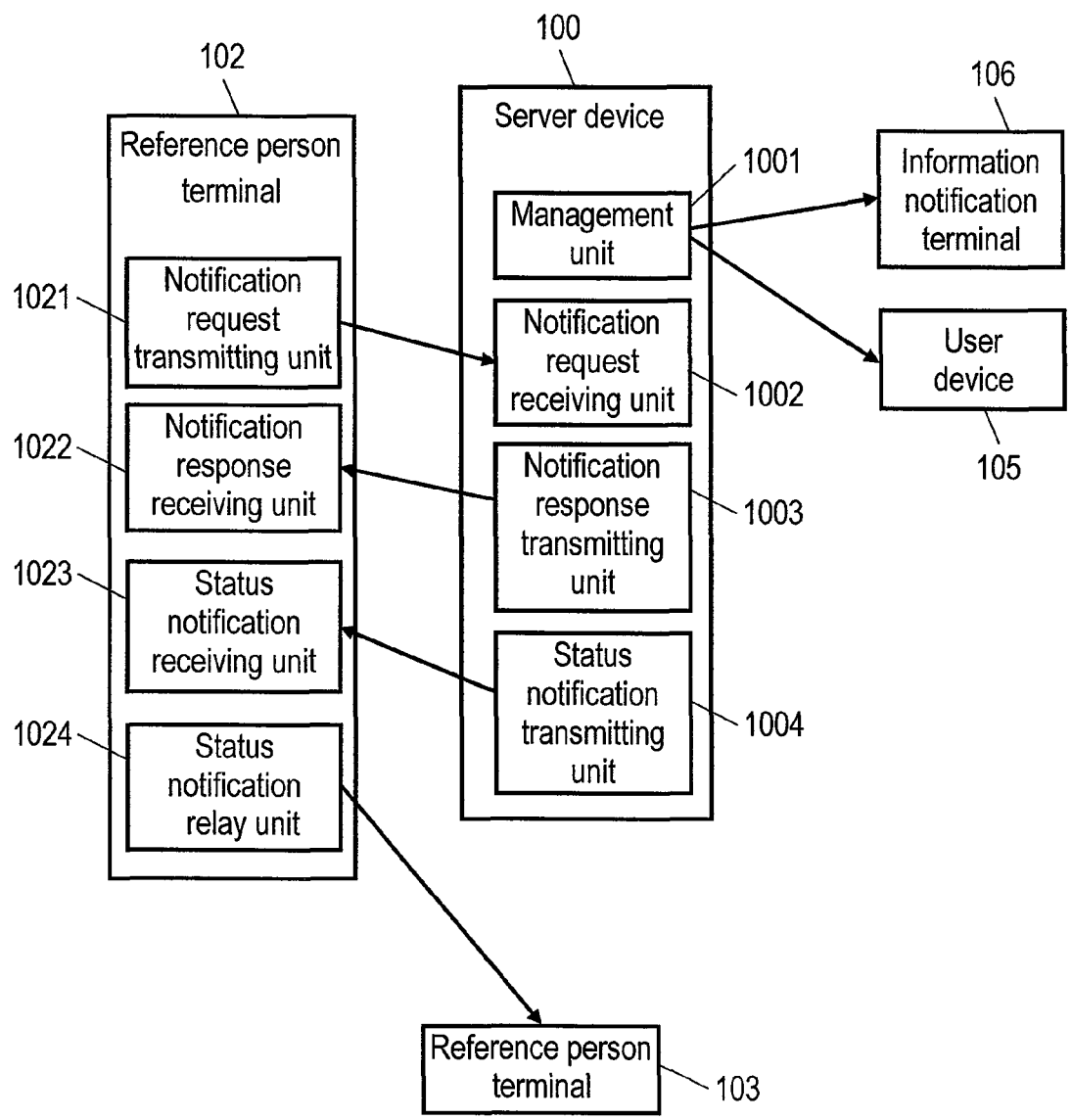
FIG. 2 is a block diagram showing a configuration of the information notification system in accordance with the first exemplary embodiment of the present invention.

FIG. 2 is a schematic diagram showing a configuration of server device 100 and reference person terminal 102 in more detail.

As shown in FIG. 2, server device 100 includes management unit 1001, notification request receiving unit 1002, notification response transmitting unit 1003, and status notification transmitting unit 1004. Furthermore, reference person terminal 102 includes notification request transmitting unit 1021, notification response receiving unit 1022, status notification receiving unit 1023, and status notification relay unit 1024. Reference person terminal 103 has the same configuration as that of reference person terminal 102.

Server device 100 always manages the status information of user device 105 and information notification terminal 106 by using management unit 1001. Examples of the managed status information include a status of whether a user is present or absent, which is obtained by the user's operation with respect to user device 105, and a status of whether the power supply of information notification terminal 106 is turned on or off. In addition to these statuses, the managed status may include a plurality of statuses such as a location of a user or a communication status of an information communication terminal.

Notification request transmitting unit 1021 of reference person terminal 102 requests server device 100 to make a notification of the status information of user device 105 and the status information of information notification terminal 106. At this time, when reference person terminal 102 has a capability of relaying an information notification message, it simultaneously transmits a notification request message noting that it has a relay capability.

When reference person terminal 102 requests server device 100 to make a notification of the status information of user device 105 and the status information of information notification terminal 106, it can request the notification while specifying only user device 105 or adding information for requesting notification of a part of the plurality of pieces of the status information of user device 105.

When a notification request message is transmitted from reference person terminal 102, server device 100 receives it in notification request receiving unit 1002. After server device 100 receives the notification request message, it transmits a response message indicating that it has received the notification request message to reference person terminal 102 by using notification response transmitting unit 1003. At this time, address information of reference person terminal 103, which has been set by a manager of server device 100 or previously provided and held, is added to the request response message and the response message is transmitted to reference person terminal 102.

For example, management unit 1001 manages each reference person terminal 102 as to the contents of notification request messages transmitted from many reference person terminals 102, which reference person terminal 102 has a relay capability, which reference person terminal 102 does not have a relay capability, and the like. Therefore, in management unit 1001, for example, a manager of server device 100 can previously set which reference person terminal 103 is to be relayed to which reference person terminals 102 having a relay capability. At this time, reference person terminal 103 to be relayed can set a plurality of reference person terminals, for example, by setting a plurality of addresses.

When server device 100 receives a notification request message, it may confirm whether or not reference person terminal 102 has a right to access the requested status information, or may authenticate whether or not reference person terminal 102 is a right reference person terminal, and the like, by, for example, referring to management information. Then, based on these results, when the results are not normal, server device 100 may add error information to the notification response message so as to reject the status notification with respect to reference person terminal 102. Furthermore, server device 100 may add address information of a plurality of reference person terminals 103 to the notification response message.

When a notification response message is transmitted from server device 100, reference person terminal 102 receives the message in notification response receiving unit 1022. When the received message includes information of reference person terminal 103, notification response receiving unit 1022 of reference person terminal 102 holds the information.

When management unit 1001 of server device 100 obtains the change of the status information of user device 105 and information notification terminal 106, a status notification message including the change of status information of user device 105 and information notification terminal 106 is transmitted to reference person terminal 102 by using status notification transmitting unit 1004 of server device 100.

Note here that the status notification message is transmitted not only to reference person terminal 102 but also all reference person terminals to which a normal notification response message has been transmitted by notification response transmitting unit 1003 among reference person terminals that have previously transmitted a notification request message and wished a status notification of user device 105 and information notification terminal 106.

Reference person terminal 102 receives a status notification message from server device 100 in status notification receiving unit 1023, and displays the received status notification message on a display of reference person terminal 102 by GUI, or carries out processing corresponding to the change of the status information.

Then, reference person terminal 102 relays at least a part of the received status notification message also to reference person terminal 103 set when notification response receiving unit 1022 receives a notification response message. For example, even when the status information of both user device 105 and information notification terminal 106 is set in the information notification message, reference person terminal 102 may relay only the status information of user device 105. Furthermore, reference person terminal 102 may relay both of the status information. Setting of such information may be carried out with respect to the notification response message.

Thus, when reference person terminal 103 receives a status notification message, the message is displayed on a display of reference person terminal 103 similar to the case of reference person terminal 102, and reference person terminal 103 carries out processing corresponding to the status information.

Therefore, in accordance with the present invention, even if the status information is not directly transmitted to reference person terminal 103 other than reference person terminal 102 from server device 100, the status information can be transmitted to reference person terminal 103 via reference person terminal 102, so that the traffic with respect to server device 100 can be reduced.

Next, a specific example of a case in which SIP (Session Initiation Protocol) is used as a message between the devices of the above-mentioned information notification system is described.

Figure 3:
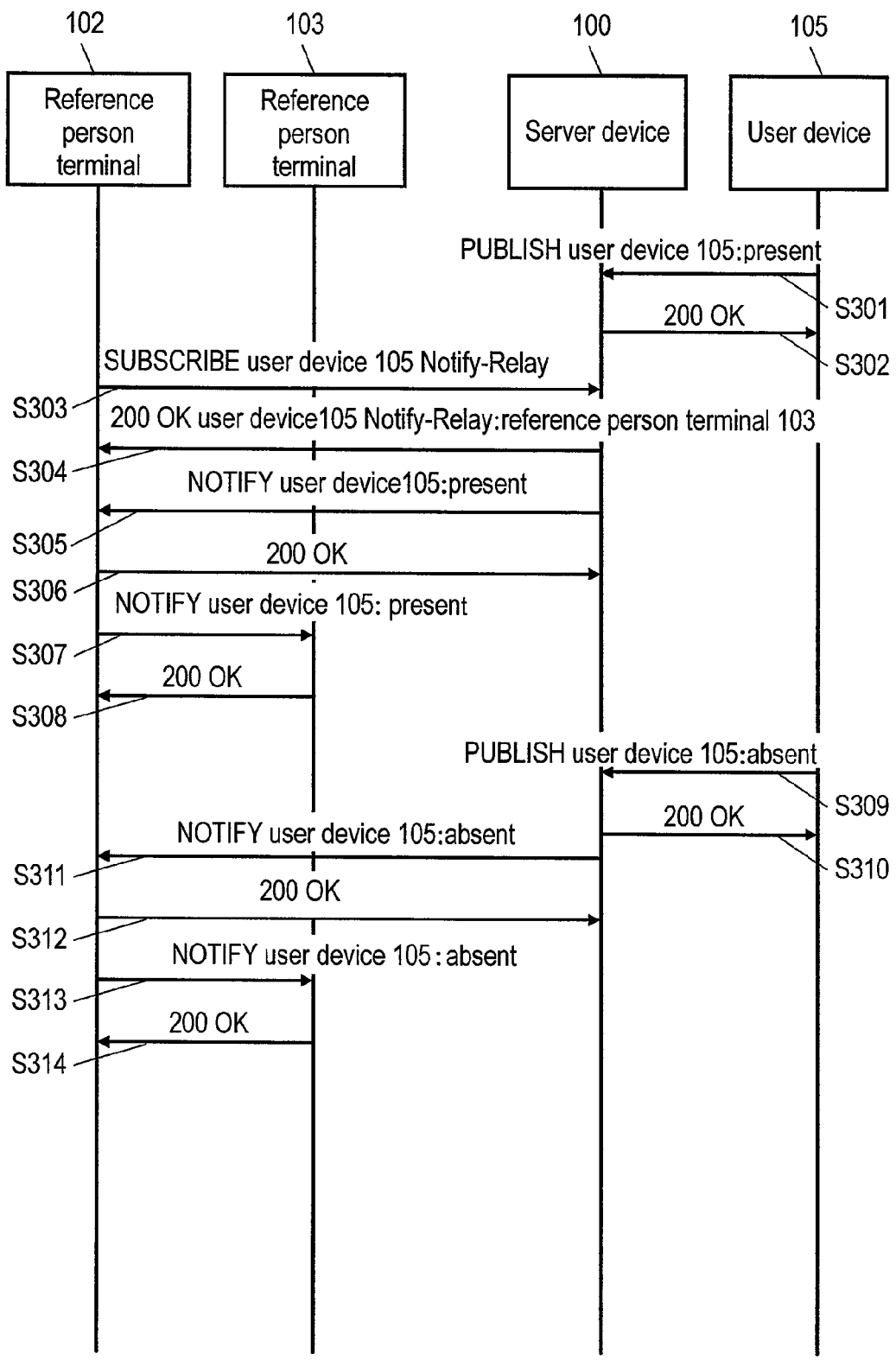
FIG. 3 is a sequence diagram showing an operation of the information notification system in accordance with the first exemplary embodiment of the present invention.

FIG. 3 is a sequence diagram showing an operation when SIP is used as a message between devices.

Server device 100 always manages status information of user device 105 and information notification terminal 106. For example, as shown in FIG. 3, server device 100 receives status information: "user device 105: present" (which means that a user operating user device 105 is present) as a PUBLISH message from user device 105 (step S301), and transmits response information "200 OK" to user device 105 (step S302).

At this time, when reference person terminal 102 transmits a SUBSCRIBE message to server device 100 as a notification request message (step S303), server device 100 receives the SUBSCRIBE message and responds a response message "200 OK" corresponding to a content requested by the SUBSCRIBE message to reference person terminal 102 (step S304).

For example, in step S303, if information for requesting notification of the status information of user device 105 and information indicating that reference person terminal 102 itself has a capability of relaying a status notification message are set in the SUBSCRIBE message, such information is transmitted from reference person terminal 102 to server device 100. Note here that such information may be set in a message header or in a message body.

Thus, in step S304, when the SUBSCRIBE message is transmitted from reference person terminal 102 to server device 100, server device 100 receives the message. When the received information is an acceptable request, server device 100 transmits response information "200 OK" as a notification response message to reference person terminal 102. At this time, when address information of reference person terminal 103 that is desired to be relayed by using reference person terminal 102 is set, server device 100 transmits also the address information as one of the notification response messages to reference person terminal 102. In this case, such information also may be set in any one of a header and a body of the notification response message.

When the change of the status information occurs in user device 105, server device 100 transmits a NOTIFY message as a status notification message to reference person terminal 102 for each change according to the request from reference person terminal 102 (step S305). Herein, in the NOTIFY message, the status information of a user managed by user device 105, for example, a status of whether a user is present or absent, is set. This status information also may be set in any of a message header and a message body.

When reference person terminal 102 receives a NOTIFY message, it transmits a response information "200 OK" showing that it has received the NOTIFY message to server device 100 (step S306). Then, reference person terminal 102 displays the status information of user device 105 on a display, or relays the NOTIFY message to reference person terminal 103 (step S307).

When reference person terminal 102 relays the NOTIFY message to reference person terminal 103, it may transmit the received status information of user device 105 as it is as a NOTIFY message to reference person terminal 103, but it may set and transmit only a part of the received status information based on an instruction from server device 100.

When reference person terminal 103 receives the NOTIFY message, it displays the message on a display of reference person terminal 103 and at the same time transmits response information "200 OK" showing that it has received the NOTIFY message to reference person terminal 102 (step S308).

When the status information of user device 105 is changed, for example, when a user managed by user device 105 becomes absent, user device 105 transmits a message indicating that a user managed by user device 105 becomes absent as a PUBLISH message to server device 100 (step S309). Server device 100 transmits a response information "200 OK" message indicating that it has received the PUBLISH message to user device 105 (step S310). Then, by the change of the status information, server device 100 transmits a NOTIFY message indicating that a user managed by user device 105 is absent and the like to reference person terminal 102 (step S311).

When reference person terminal 102 receives this NOTIFY message, it transmits response information "200 OK" indicating that it has received the NOTIFY message to server device 100 (step S312) and transmits the same NOTIFY message to reference person terminal 103 (step S313). When reference person terminal 103 receives the NOTIFY message, it transmits response information "200 OK" indicating that it has received the NOTIFY message to reference person terminal 102 (step S314), and displays the received message on a display of reference person terminal 103 and executes an operation corresponding to this.

Thus, in accordance with the first exemplary embodiment, server device 100 always manages the status of user device 105 and information notification terminal 106 as the status information. When the status information is changed in user device 105 or information notification terminal 106, server device 100 notifies a reference person terminal that makes a request that the status information is changed according to the request from the reference person terminals. Moreover, if the one reference person terminal has a relay capability, server device 100 instructs the one reference person terminal to notify another reference terminal of the change of the status information, so that the other reference person terminal is notified of the change via the one reference person terminal. Thus, it is advantageous that the server device need not make a notification to individual reference person terminals separately, so that the traffic with respect to the server device can be reduced.

FIGS. 4 to 6 show examples of message formats of a SUBSCRIBE message, response information "200 OK" to the SUBSCRIBE message, and a NOTIFY message, respectively.

As shown in FIG. 4, in the SUBSCRIBE message, "Request-URI" that is a message portion indicating which status notification is desired shows which status notification is desired by "SUBSCRIBE sip:user105@a.com SIP/2.0." A "Supported" header that is a message portion indicating a relay capability shows a relay capability by "Supported: Notify-Relay."

Furthermore, as shown in FIG. 5, in the response information "200 OK," a Supported header (Supported: Notify-Relay: sip: client103@a.com) instructs reference person terminal 103 to relay a NOTIFY message.

In addition, as shown in FIG. 6, the NOTIFY message in its message body shows the status information of information notification terminal 106.

The server device configured as mentioned above has a configuration so that it can specify other reference person terminals relaying a status notification message to a reference person terminal. Therefore, since the server device can select a relaying reference person terminal in the server device, it can instruct a reference person terminal that is near the other reference person terminal to carry out relaying, or instruct a reference person terminal to carry out relaying according to the load or capability of the reference person terminal. As a result, it is advantageous that finer distribution of the load or distribution of the traffic can be achieved.

Furthermore, the reference person terminal can relay the received status notification message to another reference person terminal. Therefore, it is not necessary that the server device should directly transmit the status notification message to the other reference person terminal. It is possible to distribute the load to the server device to a reference person terminal. Furthermore, the traffic concentrated on the server device can be distributed to the reference person terminal.

When the server device is allowed to specify another reference person terminal arbitrarily, it may be made it possible to select and specify the reference person terminal arbitrarily manually. Furthermore, when the server device is allowed to automatically specify the reference person terminal in predetermined conditions, these conditions may be set arbitrarily and the specified reference person terminal may be selected based on these conditions.

For example, when a near reference person terminal is desired to be selected, the positions of the reference person terminals are registered in the server device in advance and the near reference person terminal is selected based on the distance between the positions. Thus, the reference person terminal can be specified. Furthermore, when the reference person terminal to be relayed is desired to be selected according to the load and capability of the reference person terminal, the loads or capabilities of these reference person terminals are registered in the server device in advance or measured every time, and they are managed in the server device. Consequently, based on the data, the server device selects a reference person terminal having a relatively small load and having a capability and allows the reference person terminal to carry out relaying operation.

Second Exemplary Embodiment

Figure 7:
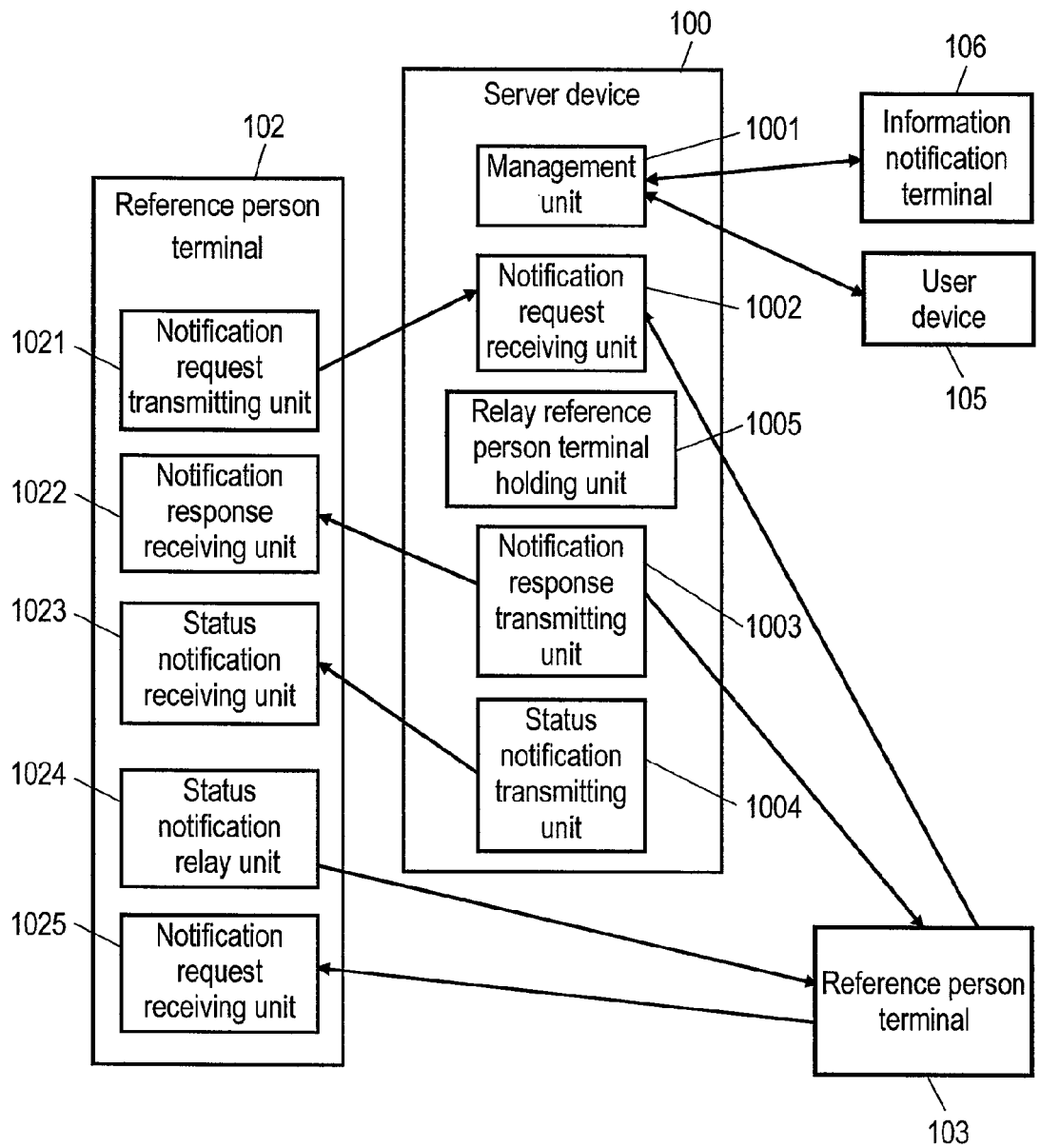
FIG. 7 is a block diagram showing a configuration of an information notification system in accordance with a second exemplary embodiment of the present invention.

FIG. 7 is a block diagram showing a schematic configuration of an information notification system in accordance with a second exemplary embodiment of the present invention.

In the information notification system in accordance with the second exemplary embodiment, as shown in FIG. 7, server device 100 includes management unit 1001, notification request receiving unit 1002, notification response transmitting unit 1003 and status notification transmitting unit 1004. In addition, server device 100 includes relay reference person terminal holding unit 1005. Furthermore, reference person terminal 102 includes notification request transmitting unit 1021, notification response receiving unit 1022, status notification receiving unit 1023, and status notification relay unit 1024. In addition, reference person terminal 102 includes notification request receiving unit 1025 for receiving a notification request message from another reference person terminal 103.

Server device 100 manages the statuses information of user device 105 and information notification terminal 106 by using management unit 1001 as in the first exemplary embodiment.

Reference person terminal 102, by using notification request transmitting unit 1021, transmits a notification request message for requesting server device 100 to make a notification of the status information of user device 105 and information notification terminal 106 and at the same time, transmits a message indicating that reference person terminal 102 has a capability of relaying the status notification message.

When a notification request message is transmitted from reference person terminal 102, server device 100 receives it in notification request receiving unit 1002. At this time, server device 100, by using relay reference person terminal holding unit 1005, judges whether or not reference person terminal 102 has a capability of relaying status notification message. If relay reference person terminal holding unit 1005 judges that reference person terminal 102 has a relay capability, it stores reference person terminal 102 as a reference person terminal having a relay capability. Server device 100 transmits a response message with respect to the notification request message to reference person terminal 102 by using notification response transmitting unit 1003.

When a notification response message is transmitted from server device 100, reference person terminal 102 receives the notification response message by using notification response receiving unit 1022.

Furthermore, when reference person terminal 103 transmits a notification request message to server device 100, if relay reference person terminal holding unit 1005 of server device 100 stores a reference person terminal to be relayed to reference person terminal 103, server device 100 transmits a notification response message indicating an error that sets address information of reference person terminal 102 to reference person terminal 103 by using notification response transmitting unit 1003. Reference person terminal 103 transmits again notification request message to reference person terminal 102 shown in the received notification response message. Reference person terminal 102 receives the notification request message that has transmitted again in notification request receiving unit 1025.

In server device 100, when management unit 1001 detects the change of the status information of user device 105 or information notification terminal 106, server device 100 transmits a status notification message setting the status information of user device 105 or information notification terminal 106 to reference person terminal 102 by using status notification transmitting unit 1004.

Reference person terminal 102 receives a status notification message from server device 100 by using status notification receiving unit 1023. Reference person terminal 102 displays the received information notification message on a display of reference person terminal 102, or carries out processing corresponding to a status, thus relaying at least a part of the received information notification message to reference person terminal 103 that has transmitted a notification request message to notification request receiving unit 1025. For example, when both information of user device 105 and information notification terminal 106 are set in the information notification message, only the status information of user device 105 may be relayed.

When reference person terminal 103 receives a status notification message, it displays the received message on a display of reference person terminal 103 or carries out processing corresponding to the status information.

Figure 8:
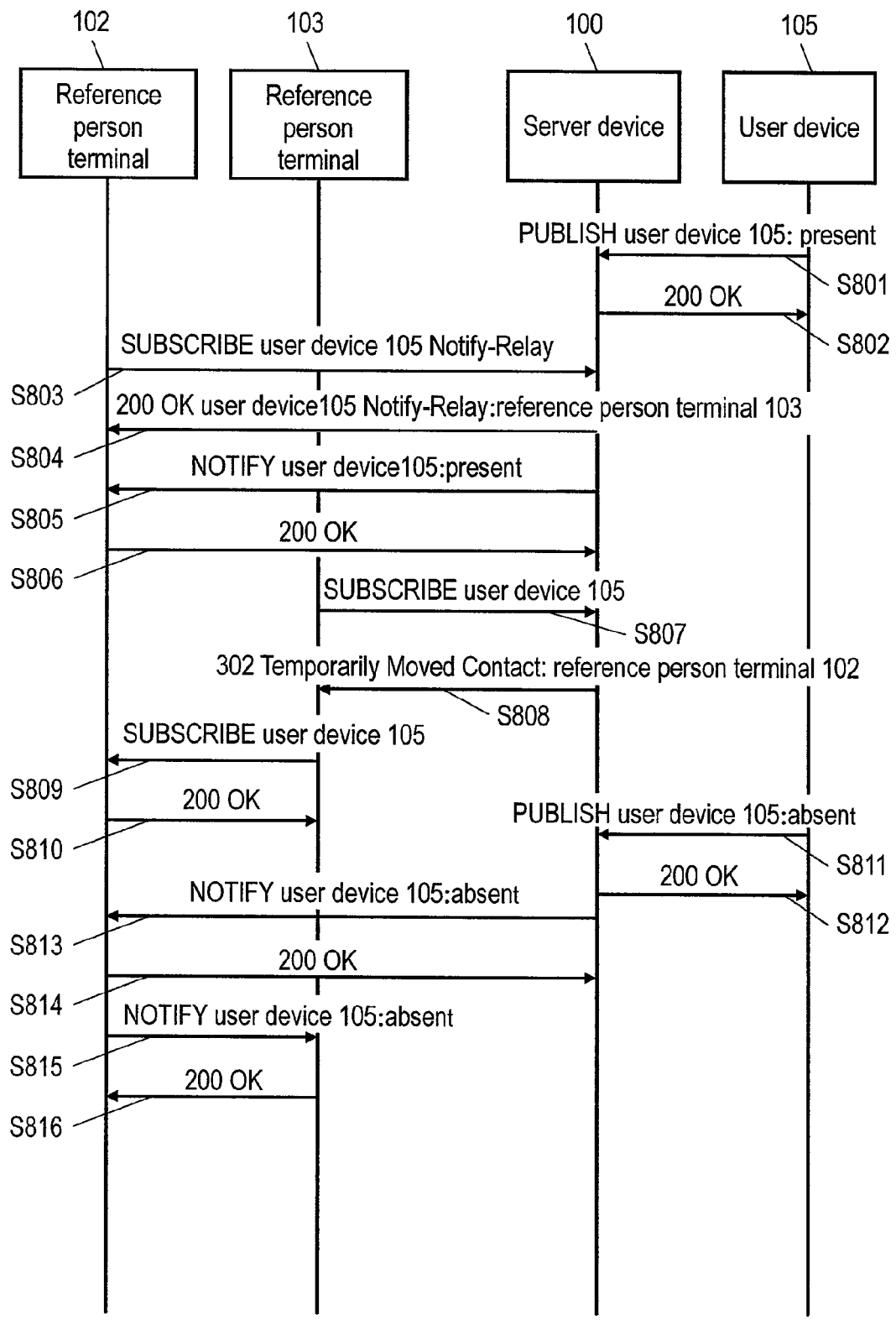
FIG. 8 is a sequence diagram showing an operation of the information notification system in accordance with the second exemplary embodiment of the present invention.

Next, with reference to a sequence diagram shown in FIG. 8, an example of the case where SIP is used as a message between devices of the information notification system in accordance with this exemplary embodiment is described specifically.

Server device 100 always manages status information of user device 105 and information notification terminal 106. For example, as shown in FIG. 8, server device 100 receives status information: "user device 105: present" as a PUBLISH message from user device 105 (step S801) and transmits response information "200 OK" to user device 105 (step S802).

At this time, when reference person terminal 102 transmits a SUBSCRIBE message to server device 100 as a notification request message (step S803). The SUBSCRIBE message sets that the status notification of user device 105 is desired and that reference person terminal 102 has a capability of relaying a status notification message.

When server device 100 receives a SUBSCRIBE message and if the message is an acceptable request, server device 100 transmits response information "200 OK" as a notification response message (step S804).

When the change of the status information occurs in user device 105, server device 100 transmits a NOTIFY message to reference person terminal 102 as an information notification message according to the request from reference person terminal 102 every time the change occurs (step S805). Herein, in the NOTIFY message, the status information such as a status whether a user managed by user device 105 is present or absent, and the like, is set. This status information may be set in any of a message header and a message body.

When reference person terminal 102 receives the NOTIFY message, it transmits response information "200 OK" as a response message to server device 100 (step S806). Then, reference person terminal 102 displays the received status information of user device 105 on a display by GUI, or carries out predetermined processing.

Reference person terminal 103 transmits a SUBSCRIBE message wishing a status notification of user device 105 to server device 100 (step S807). Server device 100 transmits a "302 Temporarily Moved" message that is a standard error response message of SIP as a notification message to reference person terminal 103 (step S808). At this time, address information of reference person terminal 102 having a function of relaying the status notification is set in a "Contact" header. Since reference person terminal 103 that has received the "302 Temporarily Moved" message receives an error message in the 300s according to the standard procedure of SIP, reference person terminal 103 transmits a SUBSCRIBE message to reference person terminal 102 set in "Contact" header again (step S809). Reference person terminal 102 responds response information "200 OK" as a response message corresponding thereto (step S810). Note here that a message transmitted by server device 100 may be any message as long as it is an error message in 300s.

As described before, server device 100 always manages the status information of user device 105 and information notification terminal 106. At this time, for example, if server device 100 receives status information as a PUBLISH message indicating that a user managed by user device 105 is absent (step S811), at this time, server device 100 transmits response information "200 OK" as a response message to user device 105 (step S812).

Thus, when server device 100 detects a change of the status information of user device 105, it transmits a NOTIFY message as a status notification message to reference person terminal 102 every time the change is detected (step S813). In the NOTIFY message, the status information such as a status whether a user managed by user device 105 is present or absent is set. This status information also may be set in any of a message header and a message body.

When reference person terminal 102 receives a NOTIFY message, it transmits response information "200 OK" as a response message responding to a NOTIFY message to server device 100 (step S814). Reference person terminal 102 displays the status information of user device 105 on a display or carries out predetermined processing, thus relaying the NOTIFY message to reference person terminal 103 (step S815). In the NOTIFY message, the received status information of user device 105 may be set as it is, or only a part thereof may be set. When reference person terminal 103 receives a NOTIFY message, response information "200 OK" is transmitted as a response message (step S816).

As mentioned above, according to the second exemplary embodiment, in reference person terminal 102, a notification request is received from reference person terminal 103. In response to this, it is possible to relay the status notification message received from server device 100 to reference person terminal 103. Therefore, it is possible to relay the status notification message according to the request of reference person terminal 103, so that load distribution that is not dependent upon the server device and transmission of the notification request with respect to the reference person terminal near the reference person terminal 103, and the like, can be carried out. Thus, more efficient traffic distribution can be achieved.

Furthermore, if once reference person terminal 103 transmits notification request to server device 100, then server device 100 instructs a reference person terminal to be relayed. Therefore, server device 100 can manage information of other reference person terminals coupled to the relaying reference person terminal. Consequently, even in a case where reference person terminal 103 is dynamically increased and reduced, more appropriate load distribution and traffic distribution can be carried out.

Furthermore, it is advantageous that even in a case of a normal reference person terminal such as reference person terminal 103 that has not a relay capability, by using a SIP standard function, a notification source of the status information can be changed from server device 100 to reference person terminal 102, so that it is possible to contain a standard reference person terminal in a simple way.

Third Exemplary Embodiment

FIG. 9 shows an example of a format of a status notification message used in an information notification system in accordance with a third exemplary embodiment of the present invention.

In the third exemplary embodiment, when reference person terminal 102 relays the received status notification message, it transmits status information of reference person terminal 102 by adding it to an information notification message. For example, in FIG. 9, in addition to the status information indicating that user managed by user device 105 is absent, which is set in the received information notification message, status information indicating that the status of reference person terminal 102 is turned on is added. At this time, if an original information notification message does not have status information of an information notification message source, as shown in FIG. 9, for example, a "user id" tag is added so as to show the issuing source of the status information.

As mentioned above, in accordance with the third exemplary embodiment, in reference person terminal 102, together with the information notification message received from server device 100, the status information of reference person terminal 102 can be transmitted to another reference person terminal 103. Therefore, the notification of the status information can be carried out more efficiently.

Fourth Exemplary Embodiment

Figure 10:
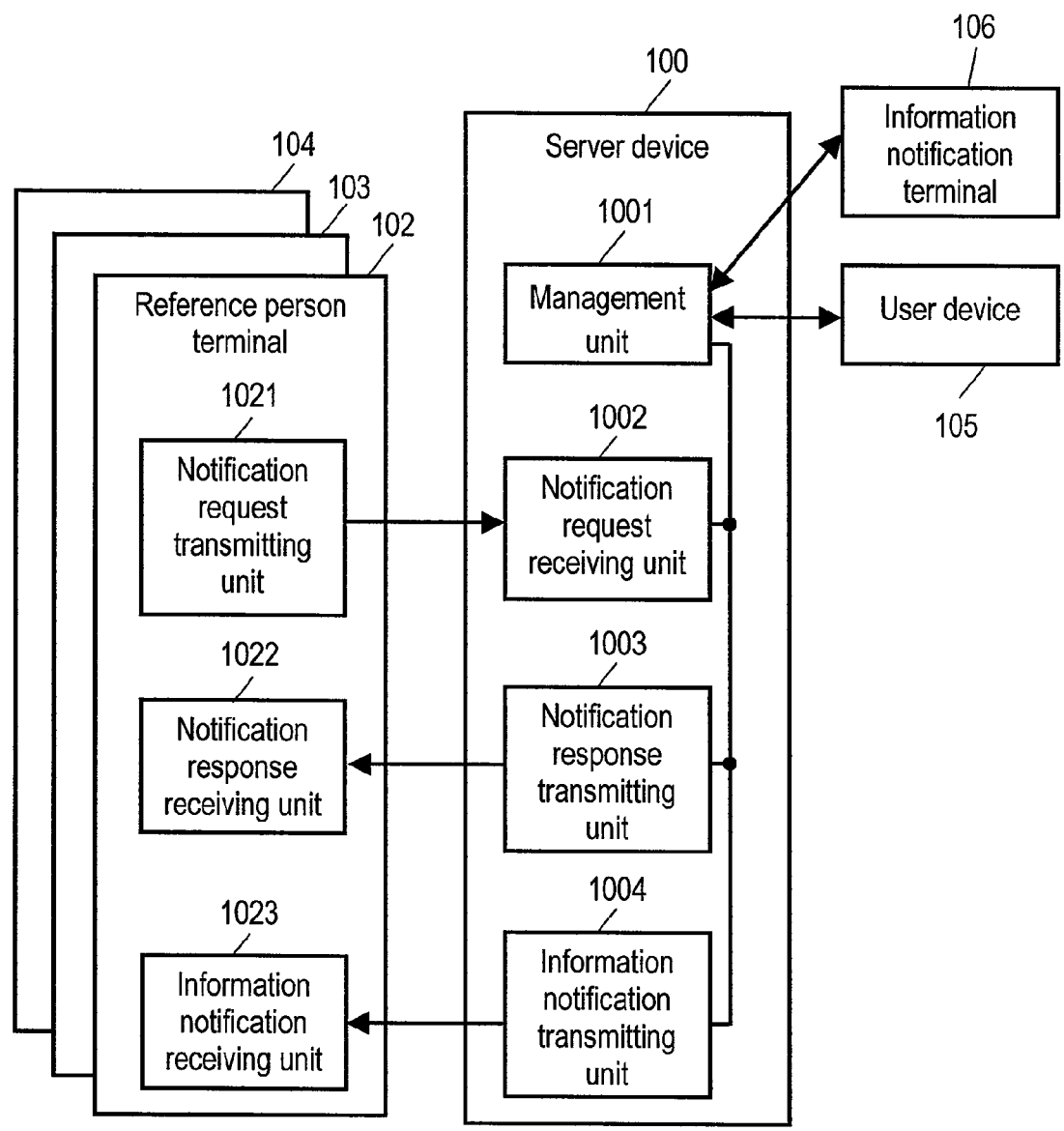
FIG. 10 is a block diagram showing a configuration of an information notification system in accordance with a fourth exemplary embodiment of the present invention.

FIG. 10 is a block diagram showing an information notification system in accordance with a fourth exemplary embodiment of the present invention.

Also in this exemplary embodiment, as in the first exemplary embodiment, server device 100 includes management unit 1001, notification request receiving unit 1002, notification response transmitting unit 1003, and status notification transmitting unit 1004.

Server device 100 of this exemplary embodiment, by using management unit 1001, manages statuses of user device 105 and information notification terminal 106 (a user is present or absent, power supply is on/off, and the like), contents of notification information messages of the statuses, transmitting and receiving timing, and contents of the notification request message requested from reference person terminal 102, and the like. At the same time, the level of load to server device 100 by the number of changes of this status and the number of user devices 105 and information notification terminals 106 is managed.

That it to say, management unit 1001 of this exemplary embodiment functions as both an information collecting unit and an information management unit. Management unit 1001 manages the status information as notification information of user device 105 and information notification terminal 106. As mentioned above, the status information is collected when server device 100 is notified by user device 105 and information notification terminal 106 or server device 100 itself obtains with respect to user device 105 and information notification terminal 106.

Reference person terminal 102 includes notification request transmitting unit 1021, notification response receiving unit 1022 and status notification receiving unit 1023 as in the first exemplary embodiment.

When management unit 1001 detects a first status change of user device 105 and information notification terminal 106 by information notification message, status notification transmitting unit 1004 of server device 100 transmits an information notification message setting the first status of user device 105 and information notification terminal 106 to reference person terminal 102.

Reference person terminal 102 receives an information notification message setting the first status information from server device 100 by using status notification receiving unit 1023. Reference person terminal 102 displays the received first status information on a display such as GUI or carries out processing corresponding to the received status information.

Herein, in this exemplary embodiment, at least one of reference person terminals 102 to 104 functions also as the information notification terminal. Also in a general presence service, one user refers to statuses of other users and notifies other users of the status information of the one user. Thus, in many cases, the presence service has both functions of the reference person terminal and the information notification terminal.

Management unit 1001 of server device 100 holds a list of the second status of reference person terminals that actually transmit (or that do not transmit) notification of the change of the first status information among reference person terminals 102 to 104 that wish to refer to the first status information when it receives the registration of the change of the first status information from information notification terminal 106. That is to say, management unit 1001 holds a list for determining whether or not the notification of the change of the first status is transmitted according to the second status.

As an example, it is thought that "notification of the change of the status information is not transmitted to a reference person terminal in which a user is absent" is set in management unit 1001 of server device 100 in advance. In this case, when server device 100 receives a notification of the first status information from information notification terminal 106, server device 100 does not notify a reference person terminal in which a user is absent in reference person terminals 102 to 104 that wish to refer to this first status information of the first status information, and notifies only a reference person terminal in which a user is present of the first status information. This exemplary embodiment describes an example in which the second status information used for judging whether or not the notification of status information is carried out is a status of whether a user is present or absent in reference person terminal. However, the exemplary embodiment is not limited to this example alone.

Next, a specific operation of the case where a SIP is used for exchanging information in server device 100, reference person terminals 102 to 104, user device 105, and information notification terminal 106 is described with reference to a sequence diagram shown in FIG. 11.

Figure 11:
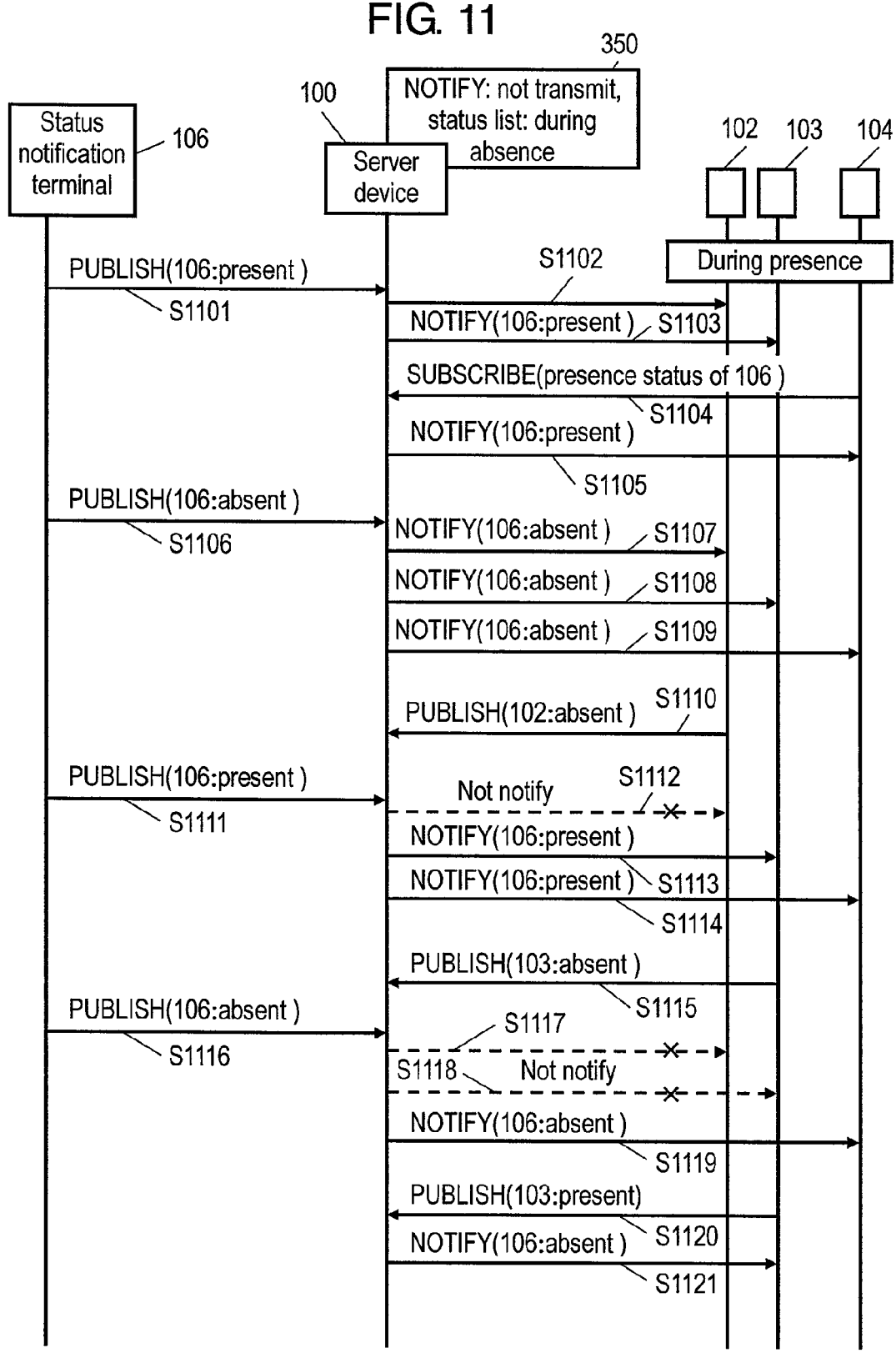
FIG. 11 is a sequence diagram showing an operation of the information notification system in accordance with the fourth exemplary embodiment of the present invention.

In FIG. 11, reference person terminals 102 to 104 are in a status of being present, and reference person terminals 102 and 103 has transmitted a SUBSCRIBE message as a notification request message in advance. Herein, the SUBSCRIBE message includes, for example, a message wishing a status notification from information notification terminal 106. When server device 100 receives a SUBSCRIBE message, since the message is an acceptable request, server device 100 transmits "200 OK" as a notification response message.

Herein, the first status in information notification terminal 106 is changed and the change of the status (106: user is present) is registered in server device 100 by a PUBLISH message (S1101). On the contrary, server device 100 transmits "200 OK" to information notification terminal 106 (not shown).

When server device 100 receives the PUBLISH message, every time the first status of information notification terminal 106 is changed, server device 100 transmits a NOTIFY message a status notification message to reference person terminals 102 and 103 (S1102 and S1103). Reference person terminals 102 and 103 receive this, and transmit "200 OK" as a notification response message to server device 100 (not shown).

Similarly, reference person terminal 104 that wishes notification of the first status of information notification terminal 106 transmits a SUBSCRIBE message (presence information of a user in terminal 106) that wishes the first information notification of information notification terminal 106 to server device 100 (S1104). Server device 100 transmits a "200 OK" message to reference person terminal 104 (not shown) and transmits a NOTIFY message (106: being present) indicating the first status information of information notification terminal 106 to reference person terminal 104 (S105). Reference person terminal 104 receives this and then transmits "200 OK" as a notification response message to server device 100 (not shown).

Next, when the first status of information notification terminal 106 is changed, by a PUBLISH message (106: a user is absent), the change of the status is registered in server device 100 (S1106). Server device 100 transmits "200 OK" as a notification response message every time the first status of information notification terminal 106 is changed (not shown), and transmits a NOTIFY message as a status notification message to reference person terminals 102 to 104 (S1107 to S1109). In the NOTIFY message, the first status of information notification terminal 106 such as a status of whether a user is present or absent in information is set. Each of reference person terminals 102 to 104 transmits a "200 OK" message indicating that it receives a NOTIFY message to server device 100 (not shown). Furthermore, each of reference person terminals 102 to 104 displays the received first status information on GUI of reference person terminals 102 to 104, or carries out processing corresponding to the status.

In management unit 1001 of server device 100 of this exemplary embodiment, in list 350 of the second status of reference person terminals 102 to 104 to which a NOTIFY message is not transmitted, "absent" is previously set. In FIG. 11, when all of reference person terminals 102 to 104 that wish to refer to the first status of information notification terminal 106 are in a status of being present, the following processing is carried out. As mentioned above, every time server device 100 receives a PUBLISH message indicating the change of the first status of information notification terminal 106 (S106), the server device 100 notifies all reference person terminals 102 to 104 by a NOTIFY message that the first status of information notification terminal 106 is changed (S1107 to S1109).

However, server device 100 receives a PUBLISH message indicating that the status is moved to a status of being absent from any of reference person terminals 102 to 104, for example, from reference person terminal 102 (S110). Server device 100 transmits a "200 OK" message indicating that it has received the PUBLISH message to reference person terminal 102 (not shown), and updates the content of management unit 1001. Furthermore, even when server device 100 receives a PUBLISH message indicating the change of the first status (106: being present) from information notification terminal 106 (S1111), server device 100 does not transmit a NOTIFY message to reference person terminal 102 in which a user is absent (S1112) and transmits a NOTIFY message only to reference person terminals 103 and 104 in which a user is present (S1113 and S1114). Reference person terminals 103 and 104 transmit a "200 OK" message indicating that they have received the NOTIFY message to server device 100 (not shown).

Similarly, thereafter, server device 100 receives a PUBLISH message indicating that the status is moved to a status of being absent from, for example, reference person terminal 103 (S1115). Server device 100 transmits a "200 OK" message indicating that it has received the PUBLISH message to reference person terminal 103 (not shown) and further updates the contents of management unit 1001.

Thereafter, when server device 100 receives a PUBLISH message indicating the change of the first status (106: a user is absent) from information notification terminal 106 (S1116), server device 100 does not transmit a NOTIFY message to reference person terminals 102 and 103 in which a user is absent at that time (S1117 and S1118), and transmits a NOTIFY message to only reference person terminal 104 in which a user is present (S1119). Reference person terminal 104 transmits a "200 OK" message indicating that it has received the NOTIFY message to server device 100 (not shown).

The NOTIFY message (106: user is absent) that is not transmitted by server device 100 during absence in reference person terminals 102 and 103 may be discarded. Furthermore, as shown in FIG. 11, for example, when server device 100 receives a PUBLISH message indicating that the second status of reference person terminal 103 is changed from the status of being absent to the other status (for example, present) from reference person terminal 103 (S1120), server device 100 may transmit the NOTIFY message to reference person terminal 103 (S1121). According to this, reference person terminal 103 transmits a "200 OK" message indicating that it has received the NOTIFY message to server device 100 (not shown).

As mentioned above, in accordance with the information notification method of this exemplary embodiment, since server device 100 previously has list 350 of the second statuses of reference person terminals 102 to 104 to which a NOTIFY message is not transmitted, it is possible to suppress unnecessary traffic for the notification of the change of the first status information of information notification terminal 106. The effect of reducing a load can be achieved. Furthermore, notification of appropriate status information can be carried out at an appropriate timing. Thus, the effect of improving the quality of the presence service can be achieved.

Fifth Exemplary Embodiment

Figure 12:
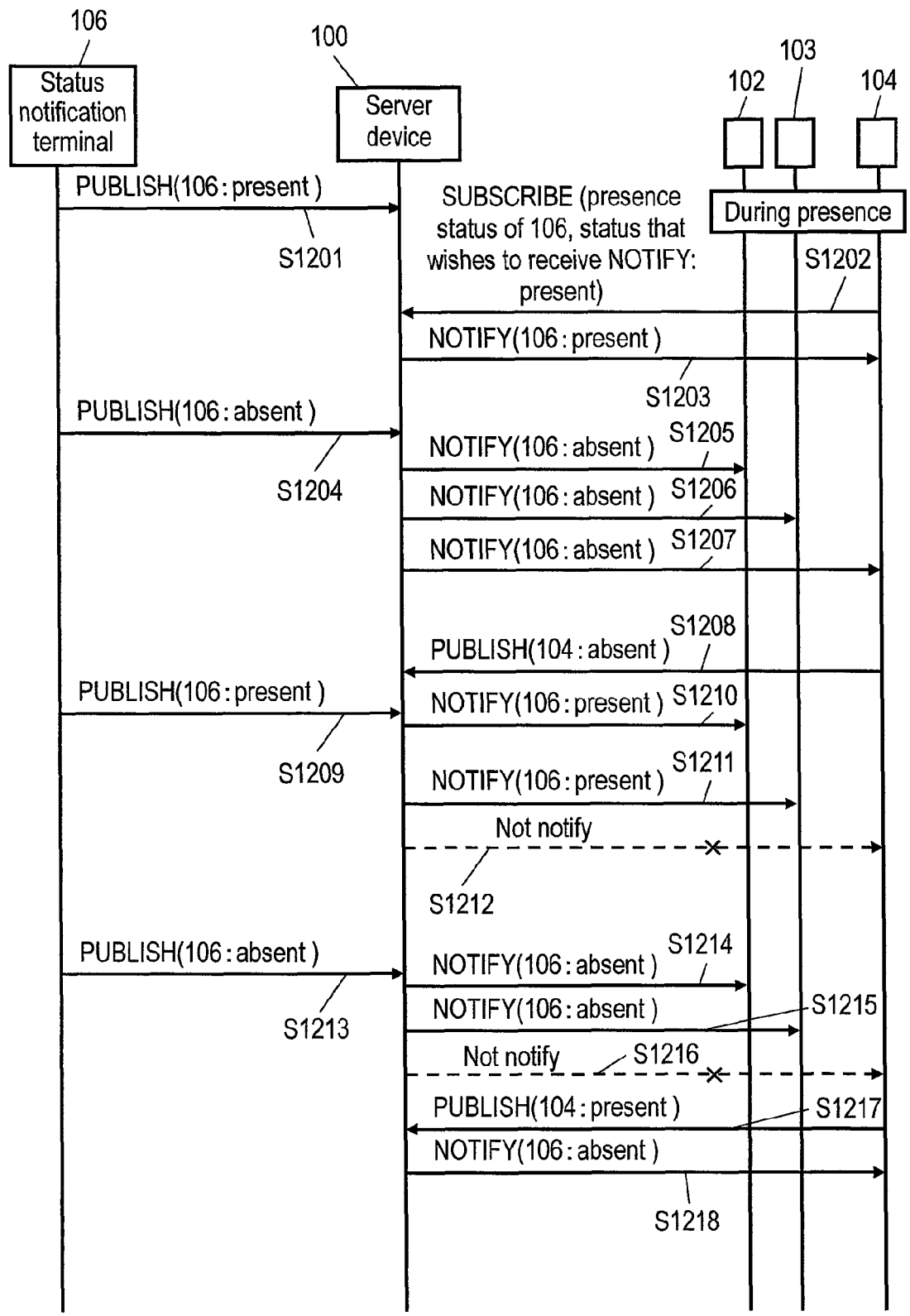
FIG. 12 is a sequence diagram showing an operation of the information notification system in accordance with a fifth exemplary embodiment of the present invention.

FIG. 12 is a sequence diagram showing an operation of an information notification system in accordance with a fifth exemplary embodiment. The configuration of the information notification system in this exemplary embodiment is the same as that shown in FIG. 10.

In FIG. 12, reference person terminals 102 to 104 are in a status of being present, and reference person terminals 102 and 103 have transmitted a SUBSCRIBE message as a notification request message to server device 100 in advance. When server device 100 receives the SUBSCRIBE message from reference person terminals 102 and 103 and if the message is an acceptable request, server device 100 transmits "200 OK" as a notification response message. In information notification terminal 106, if the first status is changed, the change of the status is registered in server device 100 by a PUBLISH message. Server device 100 transmits a "200 OK" message indicating that it has received the PUBLISH message to information notification terminal 106. Furthermore, server device 100 transmits a NOTIFY message as an information notification message to reference person terminals 102 and 103 every time the first status is changed in information notification terminal 106 is changed. Reference person terminals 102 and 103 transmit a "200 OK" message indicating that they have received the NOTIFY message to server device 100. This operation is the same as that in the fourth exemplary embodiment.

Herein, in a state in which information notification terminal 106 transmits a PUBLISH message as a first status, which indicates a status of being present, to server device 100 (S1201), reference person terminal 104 that wishes notification of the first status of information notification terminal 106 transmits a SUBSCRIBE message wishing the notification of the first status of information notification terminal 106 to server device 100 (S1202). At this time, reference person terminal 104 sets information notification terminal 106 that wishes reference and the first status information thereof, and at the same time, sets a second status of the device 104 that wishes (or does not wish) to receive a NOTIFY message to a body of the SUBSCRIBE message (S1202). In an example shown in FIG. 12, the transmission of the NOTIFY message sets "present" as the second status in reference person terminal 104 that wishes the transmission of the NOTIFY message.

When server device 100 receives the above-mentioned SUBSCRIBE message from reference person terminal 104 and if the message is an acceptable request, the server device 100 transmits a "200 OK" message as a notification response message to reference person terminal 104 (not shown) and updates the contents of management unit 1001. Then, server device 100 transmits a NOTIFY message setting the status of being present as the first status of information notification terminal 106 to reference person terminal 104 (S1203). Reference person terminal 104 transmits a "200 OK" message indicating that it has received the NOTIFY message to server device 100 (not shown).

Then, when the first status is changed, information notification terminal 106 registers the change of the first status (106: being absent) in server device 100 by a PUBLISH message (S1204). Server device 100 that receives this message transmits a "200 OK" message indicating that it has received the PUBLISH message to information notification terminal 106 (not shown). Every time the first status of information notification terminal 106 is changed, server device 100 transmits a NOTIFY message as an information notification message to reference person terminals 102 to 104 (S1205 to S1207). In the NOTIFY message, the first status of reference person terminal 106 such as a status of whether a user is present or absent is set. When each of reference person terminals 102 to 104 receives a NOTIFY message, it transmits a "200 OK" message indicating that it has received the NOTIFY message (not shown), and at the same time, each of reference person terminals 102 to 104 displays the received first status information on GUI of reference person terminals 102 to 104, or carries out processing corresponding to the status.

Herein, server device 100 notifies reference person terminal 104 by a NOTIFY message that the first status of information notification terminal 106 is changed as in the case with respect to reference person terminals 102 and 103, every time a PUBLISH message indicating the change of the first status of information notification terminal 106 is received from information notification terminal 106 while the second status of reference person terminal 104, which wishes to receive a NOTIFY message only during a status of being present, shows a status of being present.

However, when server device 100 receives a PUBLISH message from reference person terminal 104, which indicates that the status is moved to a status of being absent (S1208), server device 100 transmits a "200 OK" message indicating that it has received the PUBLISH message to reference 104 and updates the content of management unit 1001. Thereafter, when server device 100 receives the PUBLISH message indicating the change of the first status from information notification terminal 106 (S1209 and S1213), server device 100 transmits a NOTIFY message to reference person terminals 102 and 103 (S1210, S1211, S1214 and S1215), but does not transmit a NOTIFY message to reference person terminal 104 (S1212 and S1216). Every time reference person terminals 102 and 103 receive the NOTIFY message from server device 100, they transmit a "200 OK" message indicating that they have received the NOTIFY message to server device 100 (not shown).

Note here that server device 100 may discard a NOTIFY message that was not transmitted during a status of being absent. Alternatively, as shown in FIG. 12, at the time when server device 100 receives a PUBLISH message indicating that the second status is changed from the status of being absent to the status of being present in reference person terminal 104 (S1217), the NOTIFY message may be transmitted to reference person terminal 104 (S1218).

According to this exemplary embodiment configured as mentioned above, when reference person terminal 104 that wishes notification information of the first status of information notification terminal 106 transmits a SUBSCRIBE message wishing notification information of the first status of information notification terminal 106 to server device 100, the second status of device 104 that wishes (or that does not wish) to receive a NOTIFY message is set in a body of the SUBSCRIBE message and transmitted to server device 100 as a second notification information. Thus, it is possible to suppress unnecessary traffic for the notification of the change of the notification information in the first status of information notification terminal 106, and an effect of reducing the load and lowering the power consumption can be achieved. Furthermore, notification of appropriate first notification information can be carried out at an appropriate timing, thus improving the quality of the presence service.

Sixth Exemplary Embodiment

Figure 13:
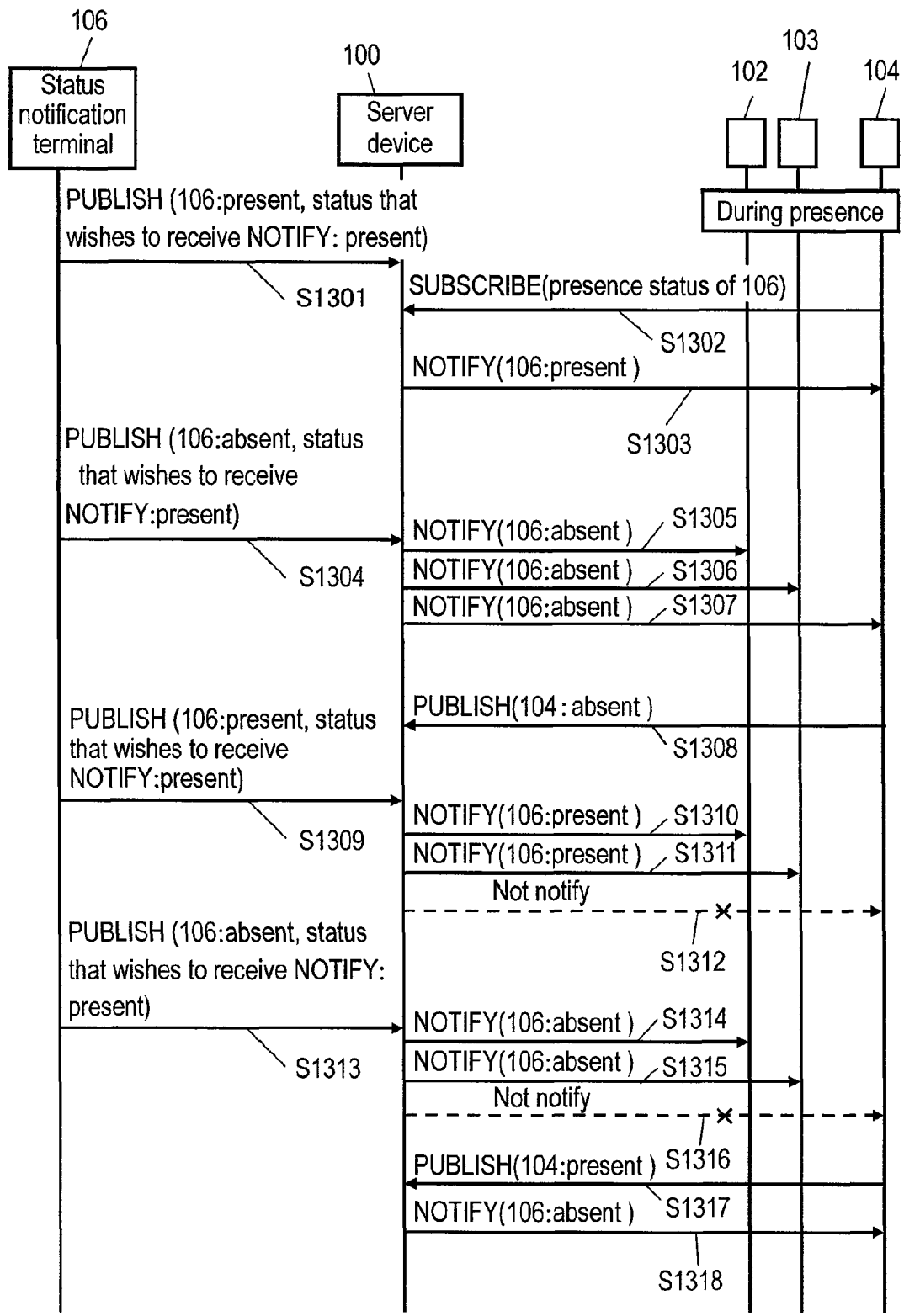
FIG. 13 is a sequence diagram showing an operation of the information notification system in accordance with a sixth exemplary embodiment of the present invention.

FIG. 13 is a sequence diagram showing an operation of an information notification system in accordance with a sixth exemplary embodiment. The configuration of the information notification system in this exemplary embodiment is the same as that of FIG. 10.

In FIG. 13, reference person terminals 102 to 104 are in a state in which a user is present, and reference person terminals 102 and 103 have transmitted a SUBSCRIBE message wishing the notification information of the first status of information notification terminal 106 as a notification request message in advance. When server device 100 receives the SUBSCRIBE message from reference person terminals 102 and 103 and if the message is an acceptable request, server device 100 transmits a "200 OK" message as a notification response message. Status registering terminal 106 registers the change of the status in server device 100 by using a PUBLISH message when the first status is changed. Furthermore, server device 100 transmits a NOTIFY message as a status notification message to reference person terminals 102 and 103 every time the first status of status registering terminal 106 is changed. This operation is the same as that in the fifth exemplary embodiment.

Information notification terminal 106 in accordance with this exemplary embodiment sets the second notification information that is a status of reference person terminals 102 to 104 which are to be notified of the change of first status of device 106 together with the first notification information that is the first status of device 106 in the body of the PUBLISH message (S1301). In an example shown in FIG. 13, "present" is set as the second notification information that is the second status of reference person terminals 102 to 104, which are to be notified of the first notification information that is the first status of device 106.

Therefore, in this status, reference person terminal 104 transmits a SUBSCRIBE message wishing the notification information of the first status of information notification terminal 106 to server device 100 (S1302). Server device 100 receives this SUBSCRIBE message and transmits a "200 OK" message as a notification response message to reference person terminal 104 (not shown). Thereafter, server device 100 transmits a NOTIFY message setting the status of being present, which is the first status notification of information notification terminal 106, to reference person terminal 104 (S1303). Reference person terminal 104 transmits a "200 OK" message indicating that it has received the NOTIFY message to server device 100 (not shown).

Thus, while the status of each of reference person terminals 102 to 104 indicated in a PUBLISH message is in a state in which a status notification is requested as the second notification information (in an example shown in FIG. 13, status of being present), every time the first status of information notification terminal 106 is changed and a PUBLISH message indicating the change of the first status of information notification terminal 106 is received (S1304), server device 100 transmits a NOTIFY message (106: a user is absent) as an information notification message to reference person terminals 102 to 104 (S1305 to S1307) and transmits the notification showing the change of the first status of information notification terminal 106. In the NOTIFY message, the first status of information notification terminal 106, for example, a status whether a user is present or absent is set. Each of reference person terminals 102 to 104 transmits a "200 OK" message indicating that it has received the NOTIFY message to server device 100 (not shown). Furthermore, reference person terminals 102 to 104 display the received first status information on GUI of reference person terminals 102 to 104, or carry out processing corresponding to the status.

Server device 100 receives a PUBLISH message from reference person terminal 104, which indicates that the status is moved to the status of being absent (S1308). Server device 100 transmits a "200 OK" message indicating that it has received the PUBLISH message to reference person terminal 104 (not shown) and at the same time updates the contents of management unit 1001. When server device 100 receives a PUBLISH message indicating the change of the first status from information notification terminal 106 (S1309 and S1313), server device 100 transmits a NOTIFY message to reference person terminals 102 and 103 in which a user is present (S1310, S1311, S1314, and S1315), but does not transmit a NOTIFY message to reference person terminal 104 in which a user is absent (S1312 and S1316).

Reference person terminals 102 and 103 that have received the NOTIFY message transmit a "200 OK" message indicating that they have received the NOTIFY message to server device 100 (not shown).

Note here that server device 100 may discard a NOTIFY message that was not transmitted during a status of being absent. Alternatively, as shown in FIG. 13, at the time when server device 100 receives a PUBLISH message indicating that the status is changed from the status of being absent to the status of being present in reference person terminal 104 to which a NOTIFY message is not transmitted (S1317), the NOTIFY message may be transmitted to reference person terminal 104 (S1318). Server device 100 and reference person terminal 104 that have received the PUBLISH message and the NOTIFY message transmit a "200 OK" message indicating that they have received the PUBLISH message and the NOTIFY message to reference person terminal 104 and server device 100, respectively (not shown).

As mentioned above, in accordance with this exemplary embodiment, information notification terminal 106 sets first notification information that is the first status of device 106 and the second notification information, which is a status of reference person terminals 102 to 104 that are to be notified of the change of the first status, in the body of the PUBLISH message. Therefore, it is possible to suppress unnecessary traffic for the notification of the change of the first state information in information notification terminal 106, and an effect of reducing a load and lowering the power consumption can be achieved. Furthermore, notification of appropriate first notification information that is the first status can be carried out at an appropriate timing, thus improving the quality of the presence service.

Seventh Exemplary Embodiment

The configuration of an information notification system in this exemplary embodiment is the same as that shown in FIG. 10. In FIG. 10, in server device 100, an operation status is defined according to the number of notifications of status information from user device 105 or information notification terminal 106 to server device 100, or the number of notifications of status information from server device 100 to reference person terminal 102. As the operation status, for example, processing of a load to server device 100 is defined, which is related to notification of status information and processing of notification information.

When server device 100 detects that a status becomes an overload state, for example, a large number of transmission events of information notification are stored, by using management unit 1001, even in a case where the status of user device 105 or information notification terminal 106 is changed and status notification transmitting unit 1004 must transmit an information notification message to reference person terminal 102, server device 100 transmits the message under predetermined conditions.

In this exemplary embodiment, a part of management unit 1001 constitutes an information management unit for controlling the transmission of notification information when an overload is applied.

Herein, the detection of an overload state by server device 100 may be carried out according to the detection conditions that are set by a manager of server device 100 or determined in advance and held. An example of the detection conditions may include the number of detections of the change of the status received in a unit time, and the number of information notification messages stored in status notification transmitting unit 1004. However, the detection conditions are not necessarily limited to these alone.

Figure 14:
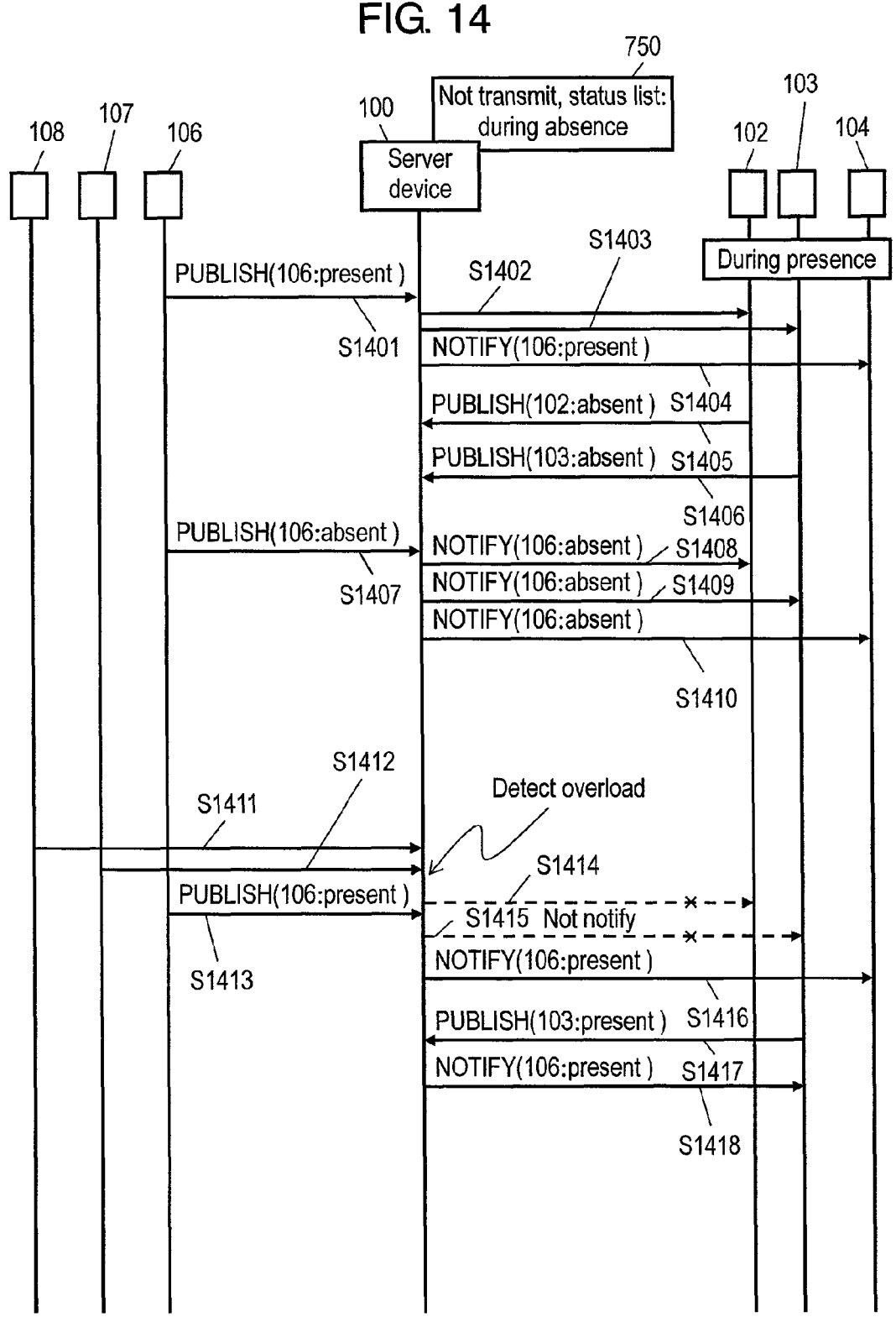
FIG. 14 is a sequence diagram showing an operation of the information notification system in accordance with a seventh exemplary embodiment of the present invention.

FIG. 14 is a sequence diagram showing an operation of an information notification system in accordance with the seventh exemplary embodiment.

In FIG. 14, reference person terminals 102 to 104 are in a state in which a user is present, and have already transmitted a SUBSCRIBE message as a notification request message to information notification terminal 106 in advance. When the first status is changed, information notification terminal 106 registers the change of the status in server device 100 as a first notification information by a PUBLISH message (S1401). Server device 100 transmits a NOTIFY message as a status notification message to reference person terminals 102 to 104 every time the first status of information notification terminal 106 is changed (S1402 to S1404). In the NOTIFY message, the first status of information notification terminal 106 such as a status of whether a user is present or absent is set.

When each of reference person terminals 102 to 104 receives a NOTIFY message, it transmits a "200 OK" message indicating that it has received the NOTIFY message to server device 100 (not shown), and at the same time, displays the received first status information on GUI of reference person terminals 102 to 104, or carries out processing corresponding to the status.

Herein, in management unit 1001 of server device 100, as list 750 of the second status of the reference person terminals to which a NOTIFY message is not transmitted when the operation status of server device 100 becomes a predetermined status, "being absent" is set in advance. Furthermore, it is thought that an operation status of server device 100 for suspending the transmission of a NOTIFY message to reference person terminals 102 to 104 in a state in which a user is absent can include the load status of server device 100. However, the status is not necessarily limited to this. In an example shown in FIG. 14, whether or not server device 100 is in an overload state is determined as an operation status used for the above-mentioned determination.

In FIG. 14, in reference person terminals 102 and 103, a status of being present is changed to a status of being absent, and a PUBLISH message indicating the change is transmitted from reference person terminals 102 and 103 to server device 100, respectively (S1405 and S1406).

Even in such a status, when server device 100 is not in an overload state, every time server device 100 receives a PUBLISH message indicating the change of the first status of information notification terminal 106 (S1407), server device 100 notifies all of reference person terminals 102 to 104 by a NOTIFY message that the first status of information notification terminal 106 is changed (S1408 to S1410).

However, in this exemplary embodiment, if PUBLISH messages from information notification terminals 106 to 108 to server device 100 are concentrated for a short time and management unit 1001 detects an overload state, when management unit 1001 of server device 100 detects an overload state (S1411 to S1413), it does not transmit a NOTIFY message to reference person terminals 102 and 103 in a second status (absent) in which a status of not-transmitting the NOTIFY message is registered as a second notification information (S1414 and S1415), but it transmits a NOTIFY message only to reference person terminal 104 during a status of being present (S1416).

Reference person terminal 104 that has received the NOTIFY message transmits a "200 OK" message indicating that it has received the NOTIFY message to server device 100 (not shown).

Note here that management unit 1001 of server device 100 may discard a NOTIFY message that cannot be transmitted during absence. Alternatively, as shown in FIG. 14, such a message may be transmitted, for example, at the time when server device 100 receives a PUBLISH message indicating that the status of reference person terminal 103 is changed from the status of being absent to the other status (S1417), or at the time when server device 100 is not in an overload state (S1418). Server device 100 and reference person terminal 103, which have received the PUBLISH message and the NOTIFY message, transmit "200 OK" messages showing that they have received the PUBLISH message and the NOTIFY message to reference person terminal 103 and server device 100, respectively (not shown).

In accordance with this exemplary embodiment configured as mentioned above, when server device 100 becomes in an overload state (S1411 to S1413), a NOTIFY message is not transmitted to reference person terminals 102 and 103 that are in a state in which a NOTIFY message not-transmitting status is registered as a second notification information in management unit 1001 of server 100. Therefore, it is possible to suppress unnecessary traffic for the notification of the change of the first status information in information notification terminal 106, and an effect of reducing the load and lowering the power consumption can be achieved. Furthermore, notification of appropriate notification information can be carried out at an appropriate timing, thus improving the quality of the presence service.

Eighth Exemplary Embodiment

Figure 15:
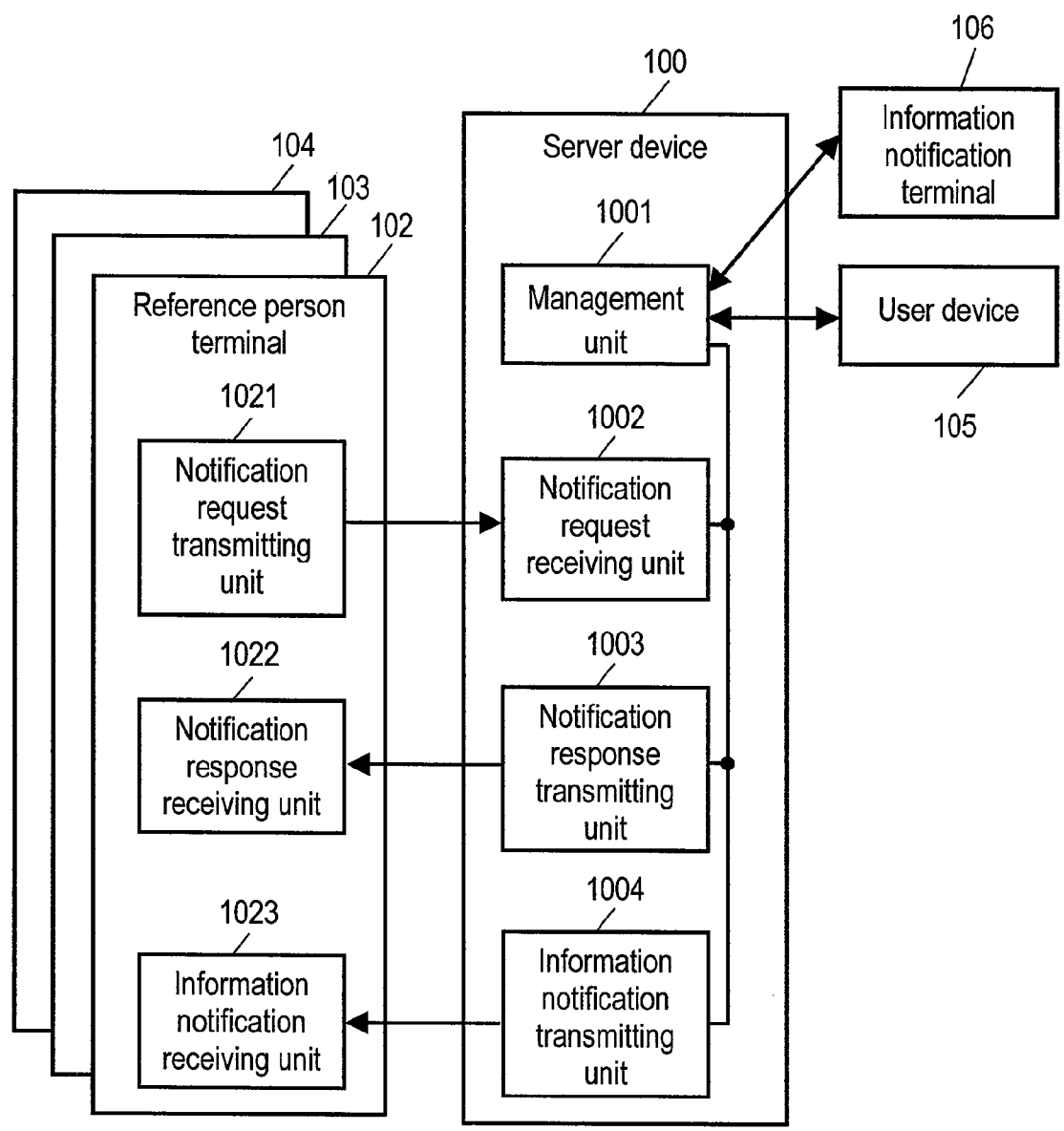
FIG. 15 is a block diagram showing a configuration of an information notification system in accordance with an eighth exemplary embodiment of the present invention.

FIG. 15 is a block diagram showing an information notification system in accordance with an eighth exemplary embodiment. As in that in the fourth exemplary embodiment, server device 100 includes management unit 1001, notification request receiving unit 1002, notification response transmitting unit 1003 and status notification transmitting unit 1004.

As in the fourth exemplary embodiment, management unit 1001 of server device 100 manages notification information including the statuses of user device 105 and information notification terminal 106 and the transmitting and receiving timing thereof as well as the level of the load to server device by the number of status change and the number of user devices 105 and information notification terminals 106.

As in the fourth exemplary embodiment, reference person terminal 102 includes notification request transmitting unit 1021, notification response receiving unit 1022 and status notification receiving unit 1023.

In server device 100 of this exemplary embodiment, an operation status is defined according to the number of notifications of the status information from user device 105 and information notification terminal 106 to server device 100 or the number of notifications of status information from server device 100 to reference person terminal 102. As the operation status, for example, processing of a load to server device 100, which is related to notification of status information and processing of notification information, is defined.

When server device 100 detects that a status becomes an overload state, for example, a large number of transmission events of information notification are stored, by using management unit 1001, even in a case where the status of user device 105 or information notification terminal 106 is changed and status notification transmitting unit 1004 must transmit an information notification message to reference person terminal 102, server device 100 dose not transmit the information notification message immediately but it temporarily suspends and then transmits after a passage of a predetermined time.

That is to say, in this exemplary embodiment, a part of management unit 1001 constitutes an information management unit for suspending the transmission of notification information at overload and transmitting notification information after a passage of a predetermined time.

Herein, the detection of an overload state by server device 100 may be carried out according to the detection conditions that are set by a manager of server device 100, or determined in advance and held. An example of the detection conditions may include the number of detections of the change of the status received in a unit time, and the number of information notification messages stored in status notification transmitting unit 1004. However, the detection conditions are not necessarily limited to these alone.

Next, a specific operation of the case where a SIP is used for exchanging information in server device 100, reference person terminals 102, 103 and 104, user device 105, and information notification terminal 106 is described in detail.

Figure 16:
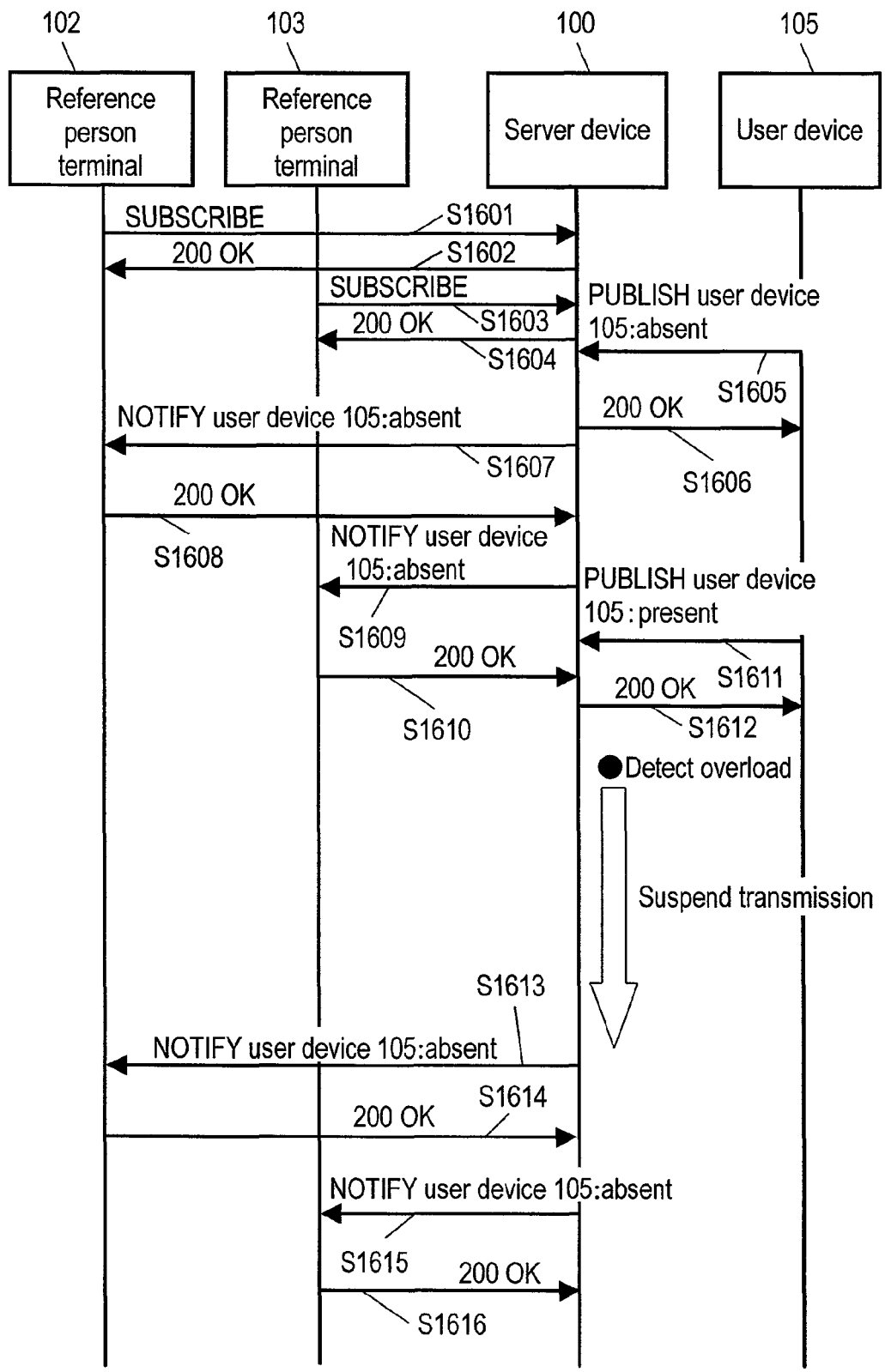
FIG. 16 is a sequence diagram showing an operation of the information notification system in accordance with the eighth exemplary embodiment of the present invention.

FIG. 16 is a sequence diagram showing an operation of an information notification system in accordance with this exemplary embodiment.

In FIG. 16, reference person terminals 102 and 103 have transmitted a SUBSCRIBE message as a notification request message to server device 100 in advance (S1601 and S1603). Herein, in the SUBSCRIBE message, for example, a message wishing information notification from user device 105 is set in advance.

When server device 100 receives the SUBSCRIBE message and if the message is an acceptable request, server device 100 has transmitted a "200 OK" message as a notification response message to reference person terminals 102 and 103 (S1602 and S1604).

When a status is changed, for example, when a user becomes absent, user device 105 notifies server device 100 by a PUBLISH message as an information notification message that the status is changed (S1605). When server device 100 receives this PUBLISH message, it transmits a "200 OK" message to user device 105 (S1606). Furthermore, server device 100 transmits a NOTIFY message as an information notification message to reference person terminals 102 and 103, respectively (S1607 and S1609). In the NOTIFY message, a status of whether a user managed by user device 105 is present or absent (absent in this exemplary embodiment) is set. When reference person terminals 102 and 103 receive the NOTIFY message, they transmit a "200 OK" message indicating that they have received the NOTIFY message to server device 100 (S1608 and S1610). Furthermore, reference person terminals 102 and 103 display the received status information on a display of reference person terminals 102 and 103, or carry out processing corresponding to the status.

Herein, during transmission processing from server device 100 to reference person terminal 103, a PUBLISH message of status notification indicating that, for example, a user managed by user device 105 is present, is newly transmitted to server device 100 from user device 105 (S1611). When server device 100 that has received the PUBLISH message detects that server device 100 is in an overload state from the detection conditions, it transmits a "200 OK" message indicating that it has received the PUBLISH message to user device 105 (S1612). However, server device 100 does not transmit a new information notification message corresponding to the received PUBLISH message to reference person terminals 102 and 103 immediately, but it newly transmits a NOTIFY message after transmission is suspended for a specified time (ST) (S1613 and S1615). After the specification for a specified time, server device 100 may discard the new information notification message that was not transmitted. The specified time (ST) may be a fixed value previously defined by a manager of server device 100, or may be determined by the following method. However, it is not limited to these methods alone.

That is to say, as a method for defining the specified time (ST), for example, when the number of messages stored in status notification transmitting unit 1004 of server device 100 is denoted by N, a processing time per message is denoted by T, and a random waiting time so that the transmission of information notification messages to reference person terminals 102 and 103 are not simultaneous with each other is denoted by R, the specified time (ST) may be expressed by the equation: specified time (ST)=T×N+R.

According to such a setting, even in a case where server device 100 must transmit information notification message to many reference person terminals 102 and 103, when the change of the status occurs in a plurality of user devices 105 for an extremely short time, for example, when a plurality of users managed by a plurality of user devices 105 referred to by reference person terminals 102 and 103 behave the same way such as attend the meeting, the load to server device 100 is smoothed in terms of time. Thus, the effect on the processing of the other services can be reduced.

That is to say, even if processing time T per message is only several seconds, when the number N of messages stored in status notification transmitting unit 1004 of server device 100 becomes the order of several hundreds and several thousands, it takes several seconds or more to complete all these processing. Therefore, when server device 100 functions also as a server device of the Internet telephone, processing of calling request message received at this timing delays by several seconds. Thus, the deterioration of the quality of service as the Internet telephone cannot be negligible.

Furthermore, for exchanging the presence information, in general, XML data are often used. Therefore, when processing of messages also includes processing with relatively large load and the processing time T per message tends to be increased. Thus, it takes a further long time to complete all the processing.

However, in accordance with this exemplary embodiment, by intentionally delaying the transmission timing of information notification messages to reference person terminals 102 and 103, a blank time is provided between transmissions of information notification messages. Therefore, the load to server device 100 is smoothed in terms of time, and an effect on the processing of the other services can be reduced.

Thereafter, reference person terminals 102 and 103 that have received a NOTIFY message transmit a "200 OK" message indicating that they have received the NOTIFY message to server device 100 (S1614 and S1616) and display the information notification message received as the NOTIFY message on a display of reference person terminals 102 and 103, or carry out a corresponding processing, respectively.

In this exemplary embodiment, message formats of the SUBSCRIBE message, the "200 OK" message responding to the SUBSCRIBE message, and the NOTIFY message have configurations shown in, for example, FIGS. 17 to 19, respectively.

That is to say, which status information is desired in the SUBSCRIBE message is shown by Request-URI (SUBSCRIBE sip:user105@a.com SIP/2.0) as shown in FIG. 17. Furthermore, the "200 OK" message corresponding to the SUBSCRIBE message is expressed as shown in FIG. 18. Furthermore, the NOTIFY message responding to FIG. 17 indicates a status of user 105 in a message body as shown in FIG. 19.

As described above, in accordance with this exemplary embodiment, server device 100 detects an operation status, that is, whether or not server device 100 is in an overload state by monitoring storage of information notification messages in reference person terminals 102 and 103 and the like. Furthermore, depending upon the operation statuses, when server device 100 receives an information notification messages from user device 105 and information notification terminal 106, it does not transmits them to reference person terminals 102 and 103 immediately but it temporarily suspends the notification and notifies again after a passage of a predetermined specified time. Therefore, when a large amount of notifications of the status information from user device 105 or information notification terminal 106 occur for a short time, server device 100 of this exemplary embodiment can intentionally delay the information notification to reference person terminals 102 and 103 in a negligible level. Furthermore, server device 100 of this exemplary embodiment can distribute the processing load to server device 100, and in particular, can distribute the load of notification processing to reference person terminals 102 and 103 in terms of time. Thus, it is possible to suppress the discarding of the information notification.

Furthermore, in accordance with this exemplary embodiment, it is not necessary to summarize information notification messages received from user device 105 and information notification terminal 106 and to notify reference person terminals 102 and 103 of the messages. Therefore, reference person terminals 102 and 103 need a function for interpreting the summarized information notification. Thus, it is possible to use conventional reference person terminals 102 and 103 as it is.

Furthermore, in accordance with this exemplary embodiment, since information notification to reference person terminals 102 and 103 can be intentionally delayed in a scope that does not cause a problem, information notification messages are not transmitted to reference person terminals 102 and 103 according to the regular update timing of status information as in a conventional device. Thus, the notification to reference person terminals 102 and 103 are not unintentionally delayed.

Furthermore, in accordance with this exemplary embodiment, since information notification to reference person terminals 102 and 103 can be delayed, it is not necessary to use a method for improving the hardware specification of server device 100 or providing a plurality of server devices 100 so as to distribute the load into each device as in a conventional device. Without using such methods, it is possible to distribute the load of notification processing to reference person terminals 102 and 103 in terms of time. Thus, the entire configuration of the system does not become complicated and therefore the cost is not increased.

Ninth Exemplary Embodiment

Figure 20:
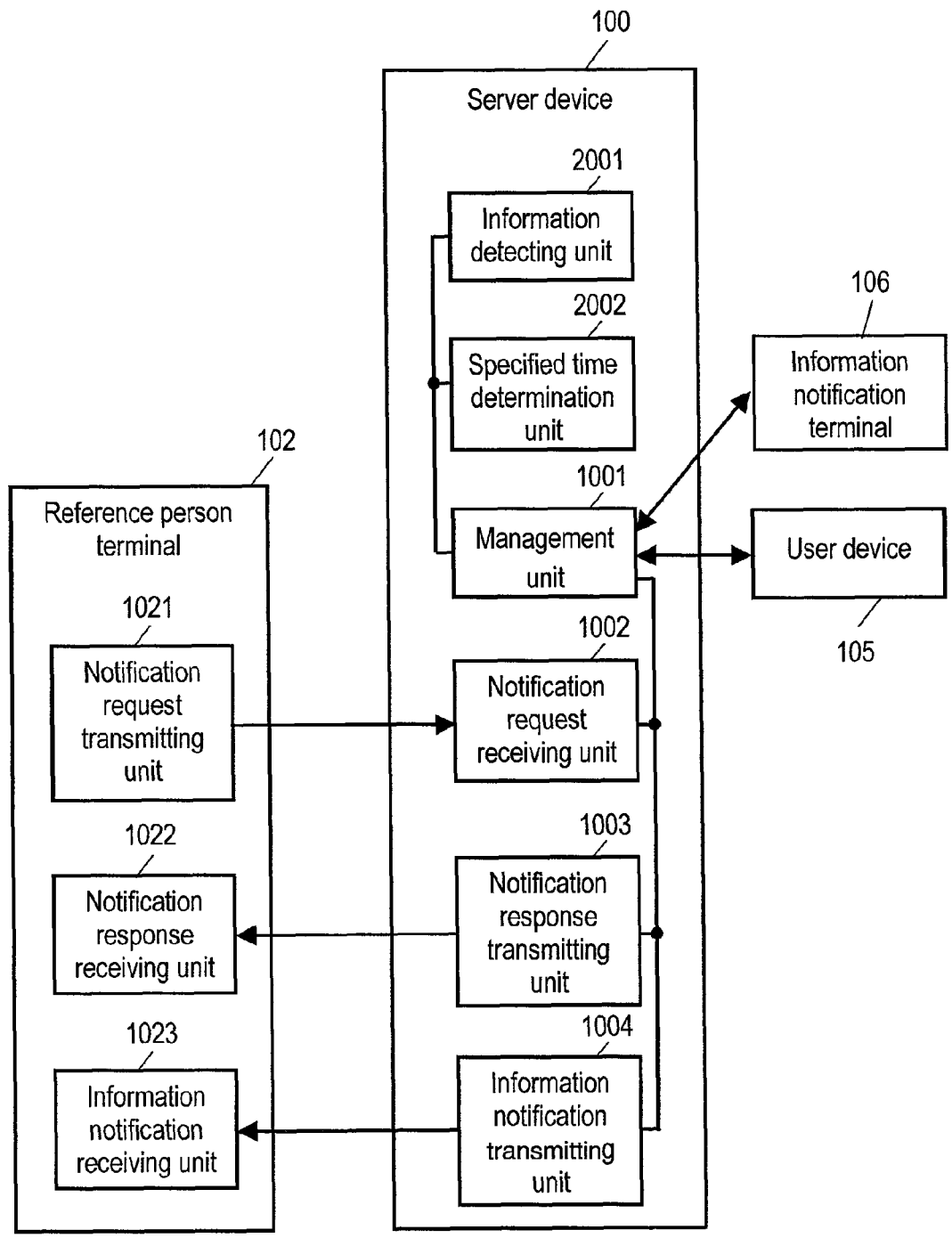
FIG. 20 is a block diagram showing a configuration of an information notification system in accordance with a ninth exemplary embodiment of the present invention.

FIG. 20 is a block diagram showing a configuration of an information notification system in accordance with this exemplary embodiment.

In this exemplary embodiment, as shown in FIG. 20, server device 100 includes, in addition to the configuration shown in FIG. 15, information detecting unit 2001 for detecting kinds of information received from user device 105 and information notification terminal 106, and specified time determination unit 2002 for determining how much time has passed after server device 100 became in an overload state and the transmission of a information notification message was temporarily suspended according to the kinds of information detected by information detecting unit 2001.

That is to say, in this exemplary embodiment, as shown in FIG. 21, priority levels such as "priority," "normal," and the like, are set according to the kinds of received information, for example, presence information, location information, or the like. Based on these priority levels, the specified times from the time when transmission of the information notification message is suspended to the time when the transmission thereof is restarted are determined, respectively.

Therefore, when server device 100 receives a PUBLISH message indicating the change of presence status, the change of location, or the like, from user device 105 and information notification terminal 106, firstly, server device 100 detects the kinds of the received PUBLISH messages and the level of the information ("priority" or "normal") by using information detecting unit 2001. As in an example shown in FIG. 21, when the kind of the received status information is presence information, the priority level shows "priority." In this case, server device 100 judges whether or not the status is in an overload state similar to the eighth exemplary embodiment. As a result, in an overload state, server device 100 transmits an information notification message to reference person terminals 102 and 103 immediately or after a passage of the specified time determined by specific time determination unit 2002 even if some period of time is suspended temporarily.

On the other hand, since the kind of the received information is location information, when it is judged that the priority level is "normal," server device 100 temporarily stops transmitting the information notification message in the case of an overload. Then, server device 100 transmits information notification to reference person terminals 102 and 103 after a passage of a relatively long specified time determined by specified time determination unit 2002. When the kinds of information is three or more, and information is expressed by a numerical value (1.0 to 0.0) like a priority level, it is natural that server device 100 delays three kinds or more of transmission to reference terminals 102 and 103.

That it to say, in this exemplary embodiment, a part of management unit 1001, information detecting unit 2001 and specified time determination unit 2002 constitute an information management unit.

Thus, if the specified time determined by specified time determination unit 2002 is set to a shorter time as the priority level becomes higher, an information notification message with a high priority level can be transmitted to reference person terminals 102 and 103 relatively earlier even if server device 100 becomes in an overload state and transmission is suspended temporarily. Thus, transmission is carried out effectively.

Note here that the specified time includes zero. The specified time of zero means that an information notification message is transmitted immediately without suspending temporarily. Furthermore, as the kinds of information, presence information and location information are mentioned as an example, but the kind is not particularly limited to these alone and other kinds of information may be included.

Thus, in accordance with this exemplary embodiment, server device 100 detects the kinds of information to be transmitted to reference person terminals 102 and 103 by using information detecting unit 2001. Server device 100 includes specified time determination unit 2002 for determining a specified time (any times including zero) from the time when the transmission to reference person terminals 102 and 103 is suspended to the time when the transmission is restarted. For example, information with a high priority level is transmitted to reference person terminals 102 and 103 after a passage of a relatively short time even if transmission is suspended temporarily, or transmitted immediately without suspending temporarily. When information has a low priority level, the transmission to reference person terminals 102 and 103 is suspended temporarily. After a passage of a sufficient specified time, the information can be transmitted to reference person terminals 102 and 103.

Therefore, a processing load to server device 100 is distributed in terms of time, discarding of information notification is suppressed, and notification of status information with a high priority level can made immediately.

Furthermore, server device 100 can set a suspending time when the notification to reference person terminals 102 and 103 is temporarily suspended according to the kinds of information transmitted to reference person terminals 102 and 103. Therefore, for example, reference person terminals 102 and 103 can be notified of an information notification message with a high priority level in a shorter time by reducing the suspending time. Furthermore, reference person terminals 102 and 103 can be notified of an information notification message with a low priority level by increasing the suspending time while improving the effect of load distribution. Therefore, the processing load to server device 100 is distributed in terms of time, discarding of information notification is suppressed, and notification of status information with a high priority level can be made preferentially immediately.

Furthermore, as in the eighth exemplary embodiment, each of reference person terminals 102 and 103 is not required to have a function of interpreting summarized information notification messages and conventional reference person terminals 102 and 103 can be used as it is. Furthermore, since information notification messages are not transmitted to reference person terminals 102 and 103 according to the regular updating timing of the status information, the notification to reference person terminals 102 and 103 is not delayed.

Furthermore, although a method of improving hardware specification of server devices 100 or a method of providing a plurality of server devices 100 so that the load can be distributed to them is not employed, the load of processing notification to reference person terminals 102 and 103 can be distributed in terms of time. As a result, an entire configuration of the system does not become complicated and cost is not increased.

Tenth Exemplary Embodiment

An information notification system of this exemplary embodiment is also configured as in the eighth exemplary embodiment conceptually and has a configuration shown in FIG. 15. However, in this exemplary embodiment, in addition to the configuration shown in FIG. 15, specified time determination unit 2002 as in the ninth exemplary embodiment described with reference to FIG. 20 is provided. Specified time determination unit 2002 of this exemplary embodiment determines according to reference person terminals 102, 103 and 104 that transmission is restarted how much time has passed after server device 100 becomes in an overload state and the transmission of information notification message was temporarily suspended.

That is to say, in this exemplary embodiment, as shown in FIG. 22, priority levels such as "priority," "normal," and the like, are set with respect to reference person terminals 102, 103 and 104. According to these priority levels, with the use of the information management unit including the specified time determination unit and a part of the management unit mentioned above, a specified time, from the time when transmission of an information notification message is suspended to the time when the transmission is restarted, is determined.

Therefore, when server device 100 detects that the status information is changed, for example, when server device 100 receives a PUBLISH message from user device 105 and information notification terminal 106, it tries to transmit the information notification message to reference person terminals 102, 103 and 104 by using status notification transmitting unit 1004. At this time, status notification transmitting unit 1004 refers to the priorities set in reference person terminals 102, 103 and 104, respectively, and determines whether or not a priority should be given to reference person terminals 102, 103 and 104.

Then, furthermore, as in the eighth exemplary embodiment 8, it is determined whether or not server device 100 itself is in an overload state. Then, if server device 100 itself is in an overload state, the transmission to reference person terminals 102, 103 and 104 is suspended temporarily and notification is carried out after a passage of a specified time. In this case, the specified time is set based on the priority determined according to reference person terminals 102, 103 and 104. For example, the specified time is set to be shorter as the priority level becomes higher. In particular, the priority level is extremely high, the specified time is set to zero and transmission is carried out immediately without suspending.

FIG. 22 shows an example in which the priority level is set individually in reference person terminals 102, 103 and 104. In reference person terminals 102, 103 and 104, for example, attribute information such as official position of a user (general manager, manager, and employee) is set. For each attribute information such as an official position, priority levels (general manager: "priority", manager: "priority", and employee: "normal") may be set. Furthermore, as to the priority level, in addition to "priority" and "normal," for example, "semi-priority" and some other priority levels may be set, and the time corresponding to the respective priority levels may be specified.

According to the thus configured exemplary embodiment, server device 100 determines a time for transmitting information to reference person terminals 102, 103 and 104 according to the above-mentioned attribute information of reference person terminals 102, 103 and 104. Therefore, for example, to reference person terminal 102 with a high priority level, notification is carried out after a passage of a relatively short time even if the transmission is suspended temporarily or transmission is carried out immediately without temporarily suspending the transmission. On the contrary, to reference person terminals 103 and 104 with a low priority level, notification can be carried out after the transmission is suspended temporarily and after a sufficient time has passed.

Therefore, processing load to server device 100 is distributed in terms of time, and discarding of information notification is suppressed. To reference person terminal 102 with a high priority level, notification of information can be made immediately.

Furthermore, server device 100 can set a suspending time when notification to reference person terminals 102, 103 and 104 is suspended temporarily according to the attribute information of reference person terminals 102, 103 and 104. Therefore, for example, to reference person terminal 102 with a high priority level, the suspending time is reduced and reference person terminal 102 is notified of information earlier. To reference person terminals 103 and 104 with a low priority level, reference person terminals 103 and 104 can be notified of information by increasing the suspending time while improving the effect of distributing the load. Therefore, the processing load to server device 100 can be distributed in terms of time, and discarding of information notification is suppressed. To reference person terminal 102 with a high priority level, notification of information can be made preferentially earlier.

Eleventh Exemplary Embodiment

An information notification system of this exemplary embodiment is also configured as in the eighth exemplary embodiment conceptually and has a configuration shown in FIG. 15. However, in this exemplary embodiment, in addition to the configuration shown in FIG. 15, server device 100 includes specified time determination unit 2002 that determines how much time has passed after server device 100 becomes in an overload state and transmission of information notification message is temporarily suspended, transmission is restarted with respect to user device 105 and reference person terminals 106 and 107.

That is to say, in this exemplary embodiment, as shown in FIG. 23, to user device 105 and information notification terminals 106 and 107, priority levels such as "priority," "normal," and "normal" are set according to the attribute information and the like. According to these priority levels, an information management unit including the above-mentioned specified time determination unit and a part of the management unit determines the specific time from the time when the transmission of information notification message is suspended to the time when the transmission is restarted.

Therefore, when server device 100 receives a PUBLISH message from user device 105 and information notification terminals 106 and 107 and detects that the status is changed, server device 100 tries to transmit an information notification message to reference person terminals 102, 103 and 104 by using status notification transmitting unit 1004. At this time, with reference to the priority levels set in user device 105 and information notification terminal 106 and 107, it is judged whether or not user device 105 and information notification terminals 106 and 107 that are notification source of information to be notified are information to be given priority. Furthermore, as in the eighth exemplary embodiment, it is judged whether or not server device 100 is in an overload state. When server device 100 is in an overload state, server device 100 temporarily suspends the transmission of information. After a passage of a specified time, server device 100 transmits the information again. The specified time is set respectively based on the priority level. For example, as the priority level is higher, the specified time is set to be shorter. When the priority level is particularly high, the specified time may be set to zero so that transmission is carried out immediately without temporarily suspending.

In FIG. 23, to user device 105 and information notification terminals 106 and 107, the priority level is set individually. However, for example, a manager of server device 100 may set attribute information such as official position (general manager, manager, and employee) of a user of the device or terminal, or the importance of the device or terminal in device 105 and information notification terminals 106 and 107, respectively, and may set priority levels for each attribution information such as official positions and importance (general manager: "priority", manager: "priority", and employee: "priority").

In accordance with this exemplary embodiment having such a configuration, in server device 100, according to the attribute information of user device 105 and information notification terminals 106 and 107 that are notification source of information, it is possible to determine whether or not the notification to reference person terminals 102, 103 and 104 is temporarily suspended. For example, in the case shown in FIG. 23, reference person terminals 102, 103 and 104 can be notified of information issued by user device 105 with a high priority level ("priority") immediately without temporarily suspending. Reference person terminals 102, 103 and 104 can be notified of information issued by information notification terminals 106 and 107 with a low priority level ("normal") after temporarily suspending. Furthermore, processing load to server device 100 can be distributed in terms of time, and discarding of information notification is suppressed. Meanwhile, notification of the status information issued by user device 105 with a high priority level can be made immediately.

Furthermore, server device 100 can set a suspending time for suspending the notification to reference person terminals 102, 103 and 104 according to the attribute information of user device 105 that is notification source of information and information notification terminals 106 and 107. For example, information issued by user device 105 with a high priority level is made to have a short suspending time and the notification thereof is made to reference person terminals 102, 103 and 104 earlier. To information issued by information notification terminals 106 and 107 with a low priority level, notification can be made while improving the effect of distributing the load by increasing the suspending time. Therefore, the processing load to server device 100 can be distributed in terms of time, and discarding of information notification is suppressed. The notification of the status information issued by user device 105 with a high priority level can be made immediately.

Twelfth Exemplary Embodiment

Figure 24:
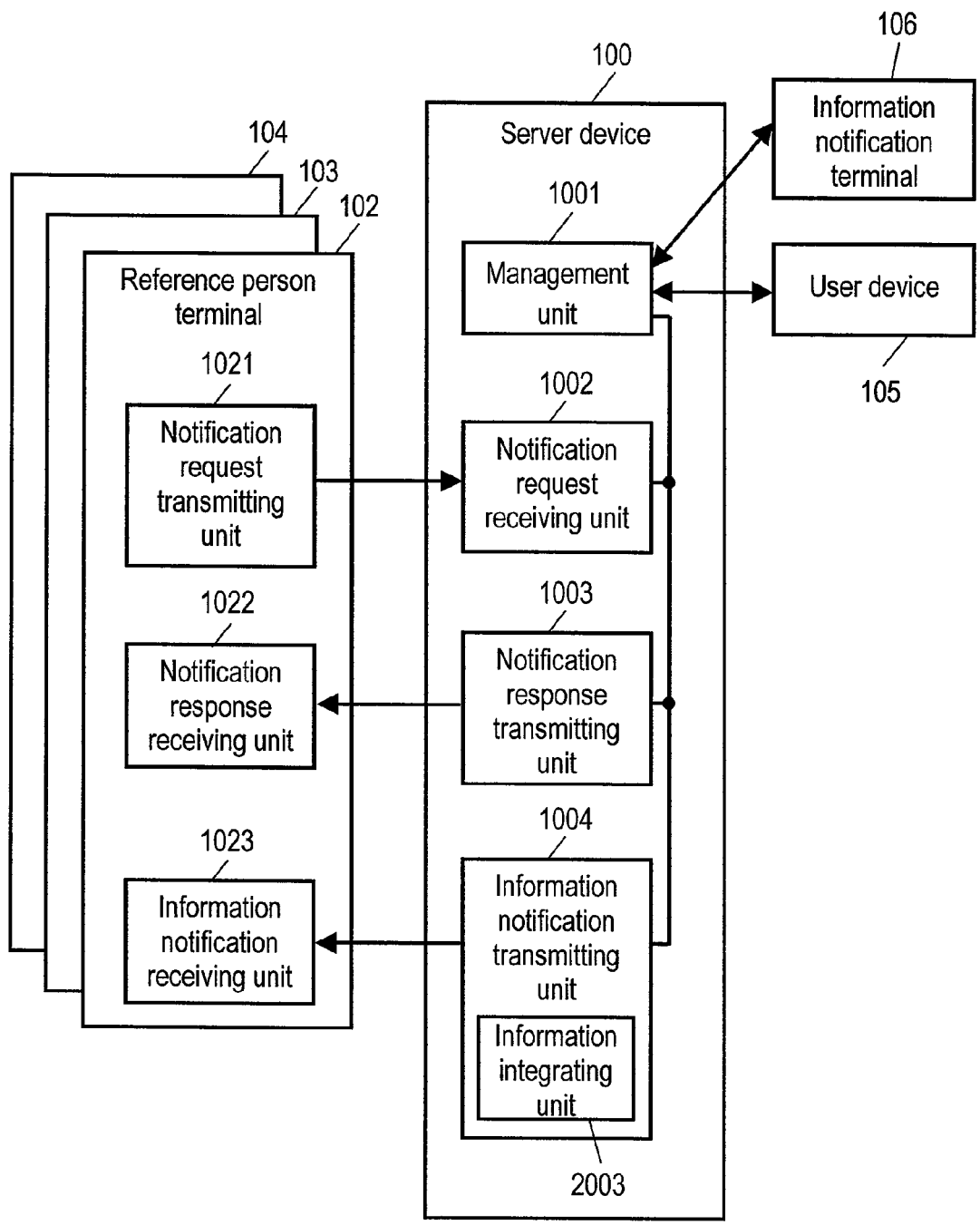
FIG. 24 is a block diagram showing a configuration of an information notification system in accordance with a twelfth exemplary embodiment of the present invention.

FIG. 24 is a block diagram showing an information notification system in accordance with this exemplary embodiment. The information notification system in accordance with this exemplary embodiment is also configured as in the eighth exemplary embodiment conceptually and has a configuration shown in FIG. 15. However, in this exemplary embodiment, in addition to the configuration shown in FIG. 15, server device 100 includes information integrating unit 2003 for transmitting the received information notification messages together to reference person terminals 102, 103 and 104. That is to say, status notification transmitting unit 1004 of server device 100 further includes information integrating unit 2003. When server device 100 transmits the received information notification messages to reference person terminals 102, 103 and 104, if server device 100 has other messages to reference person terminals 102, 103 and 104 in which transmission is suspended at that time, information integrating unit 2003 transmits such messages together to reference person terminals 102, 103 and 104. Note here that information integrating unit 2003 is not necessarily provided in status notification transmitting unit 1004 but it may be provided in server device 100.

Figure 25:
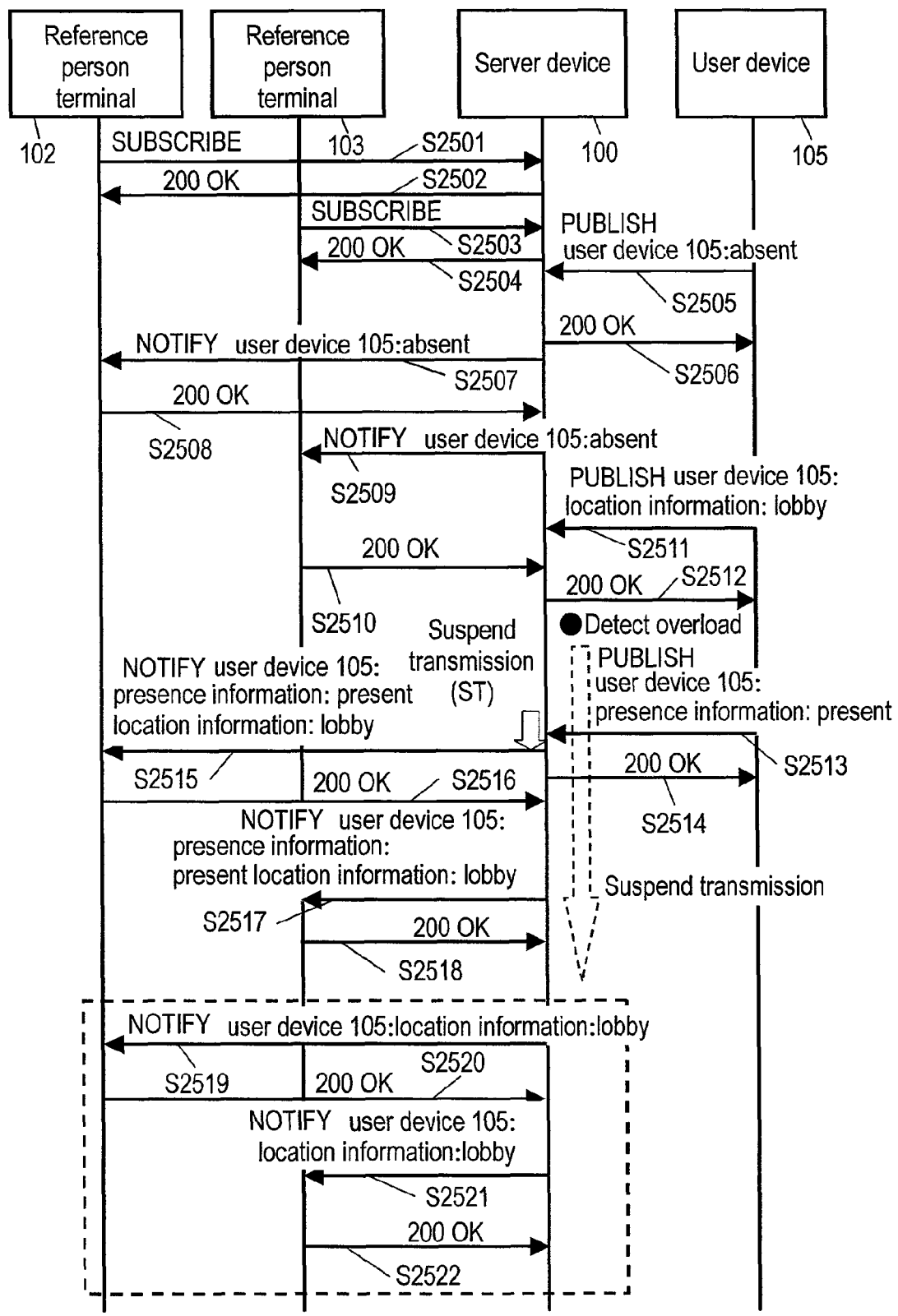
FIG. 25 is a sequence diagram showing an operation of the information notification system in accordance with the twelfth exemplary embodiment of the present invention.

FIG. 25 is a sequence diagram showing an operation of an information notification system in accordance with this exemplary embodiment.

As shown in FIG. 25, in this exemplary embodiment, reference person terminals 102 and 103 transmit a SUBSCRIBE message as a notification request message, which wishes the notification of the status information of user device 105, to server device 100 in advance (S2501 and S2503).

When server device 100 receives a SUBSCRIBE message and if the message is an acceptable request, server device 100 transmits a "200 OK" message as a notification response message to reference person terminals 102 and 103 (S2502 and S2504).

When the status information is changed, user device 105 notifies server device 100 by a PUBLISH message that the status is changed, for example, a user becomes absent (S2505). When server device 100 receives this PUBLISH message, it transmits a "200 OK" message to user device 105 (S2506). Furthermore, server device 100 transmits a NOTIFY message as an information notification message, which sets a status such as a presence status of a user managed by user device 105 (in this exemplary embodiment, being absent), to reference person terminals 102 and 103, respectively (S2507 and S2509).

When reference person terminals 102 and 103 receive the NOTIFY message, they transmit a "200 OK" message indicating that they have received the NOTIFY message to server device 100, respectively (S2508 and S2510). Furthermore, reference person terminals 102 and 103 display the received status information on a display of reference person terminals 102 and 103 or carry out processing corresponding to the status.

Thereafter, during transmission processing from server device 100 to reference person terminal 103, for example, a PUBLISH message indicating that the location information is changed to a lobby is newly transmitted from user device 105 (S2511). When server device 100 receives the PUBLISH message and it detects that server device 100 is in an overload state from the detection conditions, it transmits a "200 OK" message indicating that it has received the PUBLISH message to user device 105 (S2512). However, server device 100 does not transmit notification of new status information corresponding to the received PUBLISH message to reference person terminals 102 and 103 immediately. During the specified time (ST), the transmission is suspended.

Furthermore, if a PUBLISH message indicating that the information about a presence status, for example, the status is changed to a status of being present is newly transmitted from user device 105 during the suspension of the transmission (S2513), at this time, when server device 100 is still in an overload state, server device 100 transmits a "200 OK" message indicating that it has received the PUBLISH message to user device 105 (S2514) but does not transmit it to reference person terminals 102 and 103.

Next, when information notification to reference person terminals 102 and 103 was suspended and then a specified time (ST) has passed, server device 100 tries to transmit a NOTIFY message to reference person terminals 102 and 103. However, in this case, since information from user device 105 is newly received during the suspending of information transmission, management unit 1001 of server device 100 recognizes the presence of such information, integrates such information in information integrating unit 2003, and transmits, for example, a NOTIFY message indicating that the presence information is presence and the location information is a lobby to reference person terminals 102 and 103 (S2515 and S2517).

Therefore, originally, server device 100 transmits only a NOTIFY message indicating that a user is present as the presence information to reference person terminals 102 and 103 in steps S2515 and S2517. Thereafter, server device 100 transmits a message surrounded by a dotted line, that is, a NOTIFY message indicating that the location information of user device 105 is changed to a lobby to reference person terminals 102 and 103 (S2519 and S2521). Next, there is a "200 OK" message corresponding to the NOTIFY message from reference person terminals 102 and 103 to server device 100 (S2520 and S2522). However, in this exemplary embodiment, the information surrounded by a dotted line is not actually transmitted and the information is respectively transmitted in the NOTIFY message (S2515 and S2517) and the "200 OK" message (S2516 and S2518), which are present immediately before the information.

Thus, in accordance with this exemplary embodiment, when server device 100 suspends information notification and the notification of the information is carried out after the passage of the specified time (ST), if there is another information notification to reference person terminals 102 and 103 that are terminals in the notification destination, such information can be summarized by information integrating unit 2003 and transmitted at a time. Therefore, the number of information notifications to be transmitted by server device 100 is reduced and the load to server device 100 is reduced. Furthermore, another status information that is summarized and transmitted can have a shorter suspending time, and thus, a delay time with respect to the information notification can be reduced.

Thirteenth Exemplary Embodiment

An information notification system of this exemplary embodiment is also configured as in the eighth exemplary embodiment conceptually and has a configuration shown in FIG. 15. Furthermore, server device 100 and reference person terminal 102 in accordance with this exemplary embodiment also have a configuration that is the same as in the eighth exemplary embodiment shown a block diagram in FIG. 15.

Also in this exemplary embodiment, operation status is defined in server device 100 according to the number of information notifications from information notification terminal 106 to server device 100 and the number of notifications from server device 100 to reference person terminal 102. For example, the processing load to server device 100 related to the processing of the information notification is defined as the operation status. In the case of this exemplary embodiment, server device 100 must carry out a large number of information notifications. When management unit 1001 of server device 100 detects an overload state, status notification transmitting unit 1004 of server device 100 transmits information notification that indicates that information notification is suspended once and includes a value specifying the specified time (ST) for restarting the information notification to reference person terminal 102. Reference person terminal 102, which receives information notification indicating that information notification is suspended once, transmits a notification request to server device 100 that information such as statuses of user 105 and information notification terminal 106, and the like, should be notified by server device 100 by using notification request transmitting unit 1021 after a passage of the specified time specified in the received notification.

Conditions for detecting an overload state may be set by a manager of server device 100 in advance. Furthermore, it may be defined by other methods. In any case, the detection conditions may be determined by using the number of detections of the change of the status per unit time in management unit 1001 and the number of information notifications stored in status notification transmitting unit 1004. They are not necessarily limited to this alone.

Figure 26:
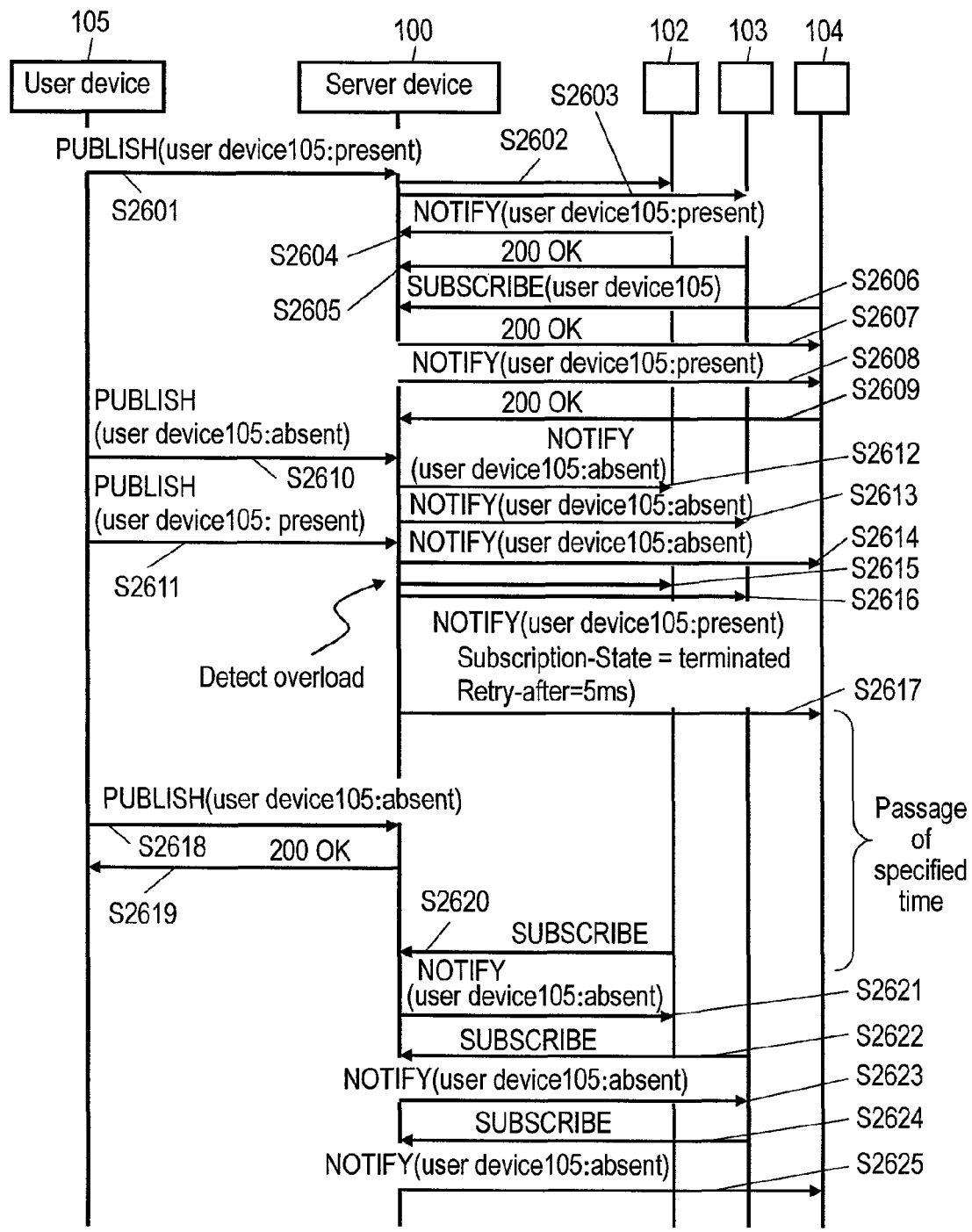
FIG. 26 is a sequence diagram showing an operation of an information notification system in accordance with a thirteenth exemplary embodiment of the present invention.

Next, an operation of this exemplary embodiment is described with reference to a sequence diagram shown in FIG. 26.

As in the above-mentioned exemplary embodiments, reference person terminals 102 and 103 transmit a SUBSCRIBE message to server device 100 as a notification request message in advance, and in the message, information that wishes to receive status information of user 105 is set (not shown). In this case, when server device 100 receives the SUBSCRIBE message and if the message is an acceptable request, server device 100 transmits a "200 OK" message as a notification response message (not shown).

In this status, at a present time, when the status of device 105 is changed, user device 105 notifies server device 100 by a PUBLISH message that the status is changed (S2601). When server device 100 receives the change of the status from user device 105, it transmits a NOTIFY message as an information notification message to reference person terminals 102 and 103, and in the NOTIFY message, the status information such as a status of whether a user managed by user device 105 is present or absent, and the like, is set (S2602 and S2603). When reference person terminals 102 and 103 receive the NOTIFY message from server device, it transmits a "200 OK" message indicating that it has received the NOTIFY message to server device 100 (S2604 and S2605). Then, reference person terminals 102 and 103 display the status information on a display of reference person terminals 102 and 103 or carry out processing corresponding to the status information based on the received NOTIFY message.

When reference person terminal 104 newly wishes to refer to the status information of user device 105, it transmits a SUBSCRIBE message indicating that it wishes to refer to the status information of user device 105 to server device 100 (S2606). When server device 100 receives the SUBSCRIBE message, it judges whether or not the message is an acceptable request. If it is an acceptable request, server device 100 transmits a "200 OK" message as a notification response message (S2607). Then, as that time, server device 100 transmits the NOTIFY message setting the status information of user device 105 to reference person terminal 104 (S2608). When reference person terminal 104 receives the NOTIFY message, it transmits a "200 OK" message indicating that it has received the NOTIFY message to server device 100 (S2609).

Thereafter, when the status of user device 105 is changed, the change of the status is transmitted as a PUBLISH message from user device 105 to server device 100 (S2610 and S2611). Based on this information, server device 100 transmits a NOTIFY message as an information notification message to reference person terminals 102, 103 and 104 (S2612 to 2614). Needless to say, although not shown, server device 100 that has received the PUBLISH message transmits a "200 OK" message indicating that it has received the PUBLISH message to user device 105. Reference person terminals 102, 103 and 104 that have received the NOTIFY message transmit a "200 OK" message indicating that they have received the NOTIFY message to server device 100, respectively.

At the present time, in the stage in which server device 100 transmits a predetermined NOTIFY message to reference person terminals 102, 103 and 104 (for example, a stage in which S2614 is completed), if server device 100 detects an overload state, server device 100 subsequently transmits the remaining NOTIFY messages to reference person terminals 102, 103 and 104 (S2615, S2616, and S2617). However, as shown in FIG. 27, this NOTIFY message includes a "Subscription-Status" header and a "retry-after" parameter. In the "Subscription-Status" header, "terminated" is set, so that reference person terminals 102, 103 and 104 is notified of the release of Subscription. Then, the "retry-after" parameter sets a value desired as a waiting time until server device 100 establishes a Subscription again. The waiting time until server device 100 establishes the Subscription again may be set arbitrarily, and it can be set by the following method.

That is to say, when the number of messages stored in status notification transmitting unit 1004 of server device 100 is denoted by N, a processing time per message is denoted by T, and a random waiting time so that the request for re-establishing the subscription from each reference person terminal is not simultaneous with each other is denoted by R, a waiting time, "retry-after," until server device 100 establishes a Subscription again is expressed by the equation:

"retry-after"=$T \times N + R$.

Server device 100 transmits a NOTIFY message in which the waiting time is set as mentioned above to reference person terminals 102, 103 and 104 (S2615, S2616 and S2617). Reference person terminals 102, 103 and 104 transmit a "200 OK" message indicating that they have received the NOTIFY message to server device 100 (not shown). Then, in this status, server device 100 waits for the passage of the time specified by the "retry-after."

Until the time specified by the "retry-after" has passed, the Subscription is not established. Therefore, even when status is changed in user device 105 and user device 105 transmits a PUBLISH message to server device 100 (S2618) and server device 100 receives the transmitted PUBLISH message and transmits a "200 OK" message indicating that it has received the PUBLISH message to user device 105 (S2619), server device 100 does not immediately transmit the change of the status of user device 105 to reference person terminals 102, 103 and 104. Consequently, server device 100 waits for a SUBSCRIBE message from reference person terminals 102, 103 and 104. Thus, it is possible to reduce a burst-like load generated when server device 100 receives a large amount of PUBLISH messages for a short time.

Next, reference person terminals 102, 103 and 104 transmit a SUBSCRIBE message to server device 100 after the passage of the specified time (ST) set in "retry-after" (S2620, S2622, and S2624). Sever device 100 that has received the SUBSCRIBE message transmits the SUBSCRIBE message indicating that it has received the SUBSCRIBE message to reference person terminals 102, 103 and 104, respectively (not shown). Thereafter, server device 100 transmits the NOTIFY message setting the status of user device 105 managed at that time to reference person terminals 102, 103 and 104, respectively (S2621, S2623 and S2625). When reference person terminals 102, 103 and 104 receive the NOTIFY message, they transmit a "200 OK" message indicating that they have receive the NOTIFY message to server device 100.

Thus, in accordance with this exemplary embodiment, reference person terminals 102, 103 and 104 can explicitly recognize that until the time specified by "retry-after" has passed, even if the status of user device 105 is changed, the notification of the change is not made. Therefore, it is possible to avoid discarding the notification of the change of the status due to the overload state of server device 100 without notification to reference person terminals 102, 103 and 104.

In server device 100, the value set in the "retry-after" is not necessarily constant, and the value may be set in accordance with the overload level detected by server device 100. For example, when the overload level is relatively low, the value is set to be relatively a small value. When the overload level is high, the value may be set to be relatively a large value. Thus, when the overload level is low, information notification can be restarted relatively early. When the overload level is high, information notification can be restarted after a sufficient time. Therefore, it is possible to optimize the balance between an effect of reducing the load to server device 100 and a real time property of information notification.

As mentioned above, FIG. 27 shows an example of a message format of the NOTIFY message (S2615, S2616, and S2617) requesting a temporary release of the subscription transmitted to reference person terminals 102, 103 and 104 in a state in which server device 100 detects an overload.

In the NOTIFY message at this time (S2615, S2616 and S2617), "Subscription-Status" is set to "terminated" and "retry-after" is set to 5 msec. Furthermore, when a request for terminating but retrying the Subscription is made to server device 100, as a "reason" parameter, "probation" is recommended to be set in IETF standard. The status of user device 105 is shown in a message body.

As mentioned above, in accordance with this exemplary embodiment, when server device 100 detects an overload state, since the information notification to reference person terminals 102, 103 and 104 is suspended temporarily, it is possible to reduce a burst-like load when a large amount of PUBLISH messages are received for a short time, and the like.

Furthermore, after temporarily suspending, information notification is not restarted until a specified time specified by "retry-after" has passed. This can be recognized explicitly by reference person terminals 102, 103 and 104. Therefore, it is possible to avoid discarding the notification of the change of the status due to the overload state of server device 100 without notification to reference person terminals 102, 103 and 104.

Then, server device 100 detects an overload state based on the number of information notifications from information notification terminal 106 and user device 105, or the number of information notifications to reference person terminals 102, 103 and 104. Therefore, when these are beyond the predetermined number, the status becomes an overload state and information notification to reference person terminals 102, 103 and 104 is temporarily suspended. Therefore, based on these numbers, the information notification is temporarily suspended, so that the load to server device 100 is reduced.

Furthermore, when the specified time from the time when transmission is temporarily suspended to the time when transmission is restarted in information notification is set to a predetermined value according to the load level of server device 100, when the load is low, information notification may be restarted relatively early. Only when the load is high, a sufficient time may be taken. Thus, it is possible to reduce the load and to carry out efficient information notification.

Fourteenth Exemplary Embodiment

This exemplary embodiment is the same as the thirteenth exemplary embodiment. However, in this exemplary embodiment, when server device 100 detects an overload state, it is determined whether or not notification of information to reference person terminals 102, 103 and 104 is temporarily suspended according to kinds (properties such as importance, urgency, immediacy, and the like) of notification information transmitted to reference person terminals 102, 103 and 104. That is to say, in this exemplary embodiment, when information notification terminal 106 has two statuses, i.e., status A and status B, when server device 100 detects an overload state, only in the case where the notification information transmitted to reference person terminals 102, 103 and 104 is related to the status B of information notification terminal 106, the information notification is temporarily suspended.

Figure 28:
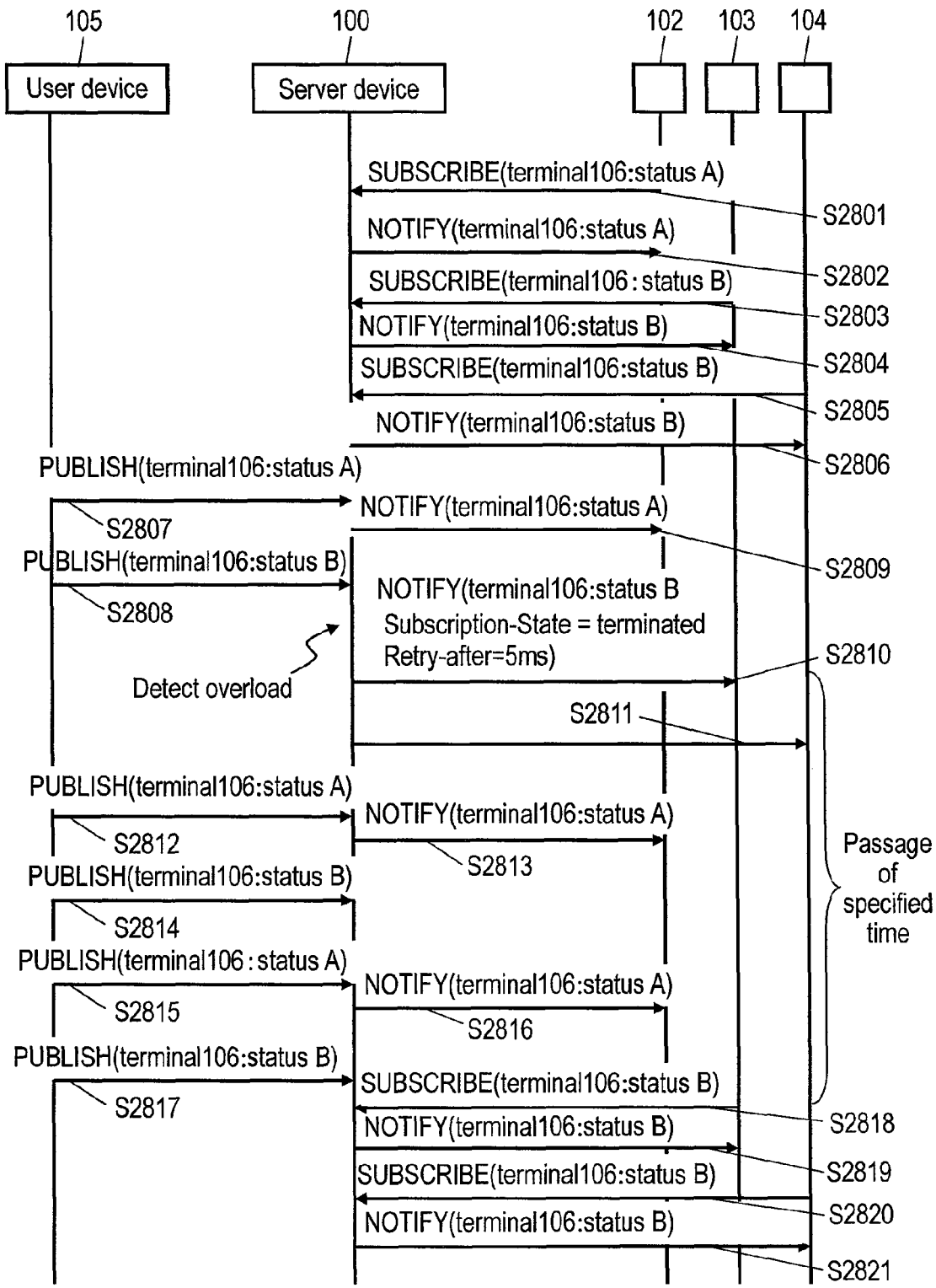
FIG. 28 is a sequence diagram showing an operation of an information notification system in accordance with a fourteenth exemplary embodiment of the present invention.

FIG. 28 is a sequence diagram showing an operation of an information notification system in accordance with this exemplary embodiment.

In this exemplary embodiment, as shown in FIG. 28, reference person terminal 102 transmits a SUBSCRIBE message to server device 100, and the SUBSCRIBE message wishes to receive an information notification relating to the status A of information notification terminal 106 (S2801). On the other hand, reference person terminals 103 and 104 transmit a SUBSCRIBE message that wishes to receive an information notification relating to status B of information notification terminal 106 to server device 100 (S2803 and S2805).

When server device 100 receives a SUBSCRIBE message, it judges whether or not the message is an acceptable request. If it is an acceptable request, server device 100 transmits a "200 OK" message as a notification response message to reference person terminals 102, 103 and 104 (not shown).

Then, in information notification terminal 106, when there is a change in status A or status B, and the change is transmitted as a PUBLISH message to server device 100, the present status of the transmitted status A or status B is set in a NOTIFY message as an information notification message. The NOTIFY message is transmitted to reference person terminals 102, 103 and 104 (S2802, S2804 and S2806).

When reference person terminals 102, 103 and 104 receive the NOTIFY message, they transmit a "200 OK" message indicating that they have received the NOTIFY message to server device 100 (not shown). Then, reference person terminals 102, 103 and 104 display the received status information on a display of reference person terminals 102, 103 and 104, or carry out processing corresponding to the status information.

Now, when there is a change in status A or status B, and the change is transmitted as a PUBLISH message to server device 100 (S2807 and S2808), server device 100 transmits a "200 OK" message indicating that it has received the PUBLISH message to information notification terminal 106 (not shown).

At this time, when server device 100 detects an overload state, server device 100 transmits a predetermined specific NOTIFY message only to a reference person terminal requesting the information notification of a predetermined status, and transmits a normal NOTIFY message to other reference person terminals. For example, when the predetermined status is status B, a reference person terminal requesting the information notification of the status B is reference person terminals 103 and 104. Therefore, to reference person terminals 103 and 104, a specific NOTIFY message is transmitted. The specific NOTIFY message includes information instructing to temporarily suspend the information notification of the status B of information notification terminal 106 and to restart the information notification after a specified time (S2810 and S2811). To the other reference person terminal 102, a normal NOTIFY message for immediately making notification of the status A of information notification terminal 106 is transmitted (S2809).

The NOTIFY message includes a "Subscription-Status" header and a "retry-after" parameter. Herein, in the specific NOTIFY message, in the "Subscription-Status" header, "terminated" is set. Reference person terminals 103 and 104 are notified of the release of the Subscription. Then, a "retry-after" parameter sets a value that is desired as a waiting time until server device 100 re-establishes the Subscription.

Therefore, reference person terminals 103 and 104 that have received this NOTIFY message transmit a "200 OK" message to server device 100 (not shown) and wait for the passage of the specified time specified by the "retry-after" parameter.

Until the time specified by the "retry-after" parameter has passed, since the Subscription is not established, even if the status B of information notification terminal 106 is changed (S2814 and S2817), server device 100 does not carry out the notification to reference person terminals 103 and 104.

On the other hand, to reference person terminal 102, while the Subscription is released once in reference person terminals 103 and 104, server device 100 maintains and continues the Subscription and transmits a NOTIFY message to reference person terminal 102 (S2813 and S2816) every time the status A is changed (S2812 and S2815).

Thus, it is possible to reduce a burst-like load generated when server device 100 receives a large amount of PUBLISH messages for a short time.

After the passage of the time specified in the "retry-after," reference person terminals 103 and 104 transmit a SUBSCRIBE message to server device 100 (S2818 and S2820). Server device 100 that has received the SUBSCRIBE message transmits a "200 OK" message (not shown) to reference person terminals 103 and 104, and then transmits a NOTIFY message setting the status B of the currently managed information notification terminal 106 to reference person terminals 103 and 104, respectively (S2819 and S2821). When reference person terminals 103 and 104 receive the NOTIFY message, they transmit a "200 OK" message indicating that they have received the NOTIFY message to server device 100 (not shown).

Reference person terminals 103 and 104 can explicitly recognize that notification is not carried out even if the status of information notification terminal 106 is changed until the time specified by the "retry-after" parameter has passed. Therefore, it is possible to avoid discarding the notification of the change of the status due to the overload state of server device 100 without notification to reference person terminals 102, 103 and 104.

Furthermore, when server device 100 detects an overload state, a status in which a Subscription is once released and a status in which a Subscription is maintained and continued can be set by a manager of server device 100 or determined in advance. These can be stored in server device 100. In this case, by classifying and defining information according to the importance or immediacy of information managed by server device 100, when server device 100 becomes in an overload state, information notification of the important status information or status information requiring immediacy can be carried out continuously while reducing a load to server device 100. Thus, the service quality of information notification can be improved without deteriorating thereof.

Furthermore, when server device 100 detects an overload status and releases a Subscription once, according to the importance or immediacy managed by server device 100, a value set in "retry-after" can be made to be a smaller value as, for example, the importance or immediacy is larger. Thus, as the importance or immediacy is larger, the information notification can be restarted earlier. Thus, it is possible to keep the balance between reduction of load to server device 100 and a real time property of information notification.

The values of conditions to be set in the "retry-after" may be arbitrarily set by a manager of server device 100 or defined in advance. In any case, these are held in server device 100.

Fifteenth Exemplary Embodiment

This exemplary embodiment has the same configuration as that of the thirteenth exemplary embodiment. In exemplary embodiment, however, when server device 100 detects an overload state, it is determined whether or not the information notification is temporarily suspended according to attributes of reference person terminals 102, 103 and 104. That is to say, to reference person terminals 103 and 104, information notification is suspended temporarily. To reference person terminal 102, information notification is carried out without temporarily suspending.

Figure 29:
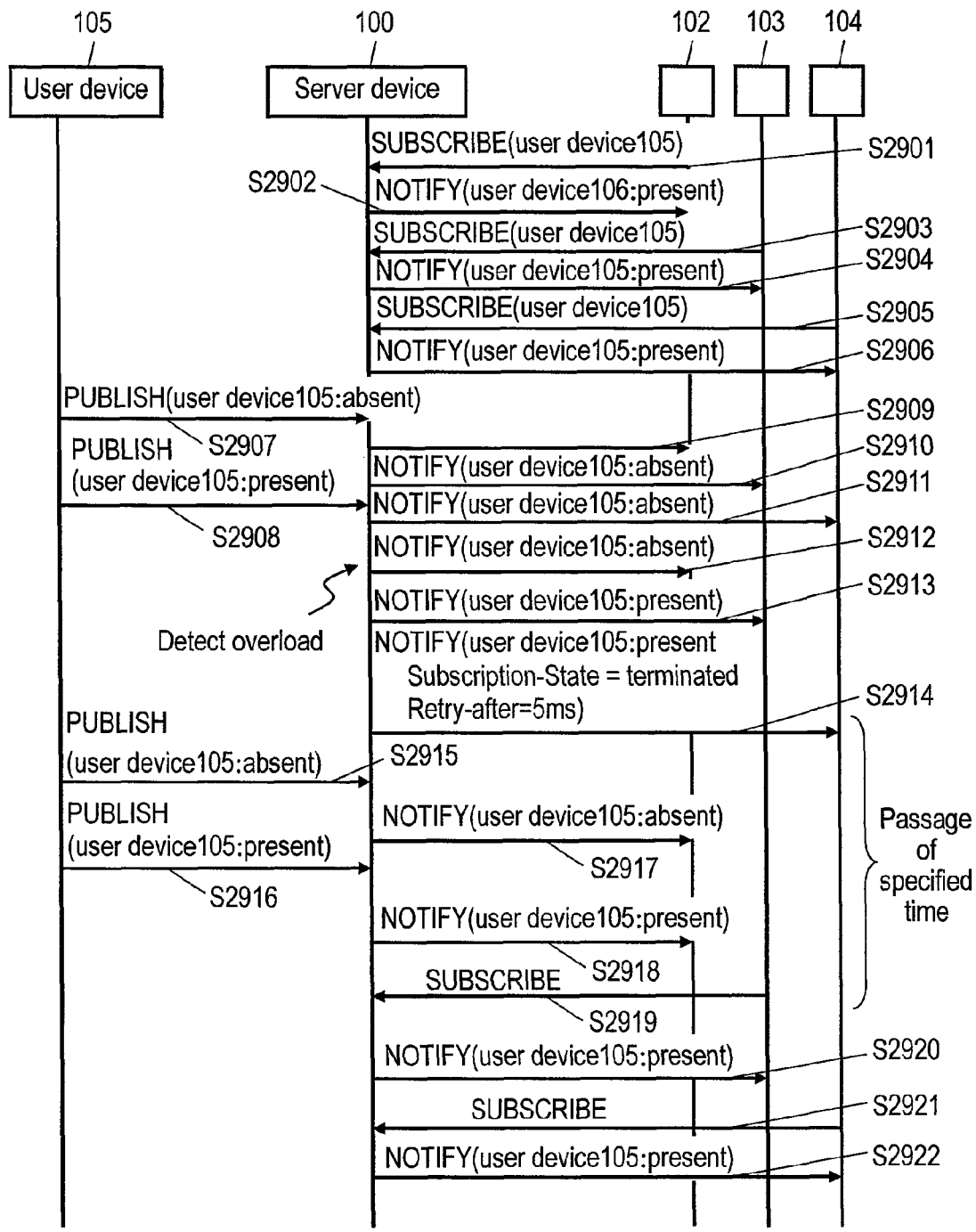
FIG. 29 is a sequence diagram showing an operation of an information notification system in accordance with a fifteenth exemplary embodiment of the present invention.

FIG. 29 is a sequence diagram showing an operation of an information notification system in accordance with this exemplary embodiment.

As shown in FIG. 29, if reference person terminals 102, 103 and 104 transmit a SUBSCRIBE message as a notification request message wishing notification of information such as status information of user device 105 to server device 100 (S2901, S2903 and S2905). Then, server device 100 that has received the SUBSCRIBE message judges whether or not the message is an acceptable request. If the message is an acceptable request, server device 100 transmits a "200 OK" message as a notification response message to reference person terminals 102, 103 and 104 (not shown).

Server device 100 that has received the SUBSCRIBE message transmits a NOTIFY message setting information such as the status information of user device 105 at that time to reference person terminals 102, 103 and 104, respectively (S2902, S2904 and S2906). Reference person terminals 102, 103 and 104 receive the transmitted NOTIFY message and transmit a "200 OK" message indicating that they have received the NOTIFY message to server device 100 (not shown).

When the status is changed in user device 105, the notification of the change of the status of user device 105 is transmitted from user device 105 to server device 100 as a PUBLISH message (S2907 and S2908). Every time server device 100 receives information notification from user device 105, it transmits a NOTIFY message in which status information of information notification terminal 105 such as a status of whether a user is present or absent is set as an information notification message to reference person terminals 102, 103 and 104 (S2909, S2910 and S2911). Reference person terminals 102, 103 and 104 transmit a "200 OK" message indicating that they have received the NOTIFY message to server device 100 (not shown) and at the same time display the status information of user device 105 on a display based on the received NOTIFY message, or carry out processing corresponding to the status information.

Now, when server device 100 detects an overload state, it transmits a NOTIFY message only to a predetermined reference person terminal, for example, reference person terminals 103 and 104, for temporarily releasing a Subscription and establishing the Subscription after a passage of a predetermined specified time. In this case, server device 100 transmits a NOTIFY message in which status information of user device 105 such as a status of whether a user is present or absent to reference person terminal 102 similar to the above-mentioned case (S2912). Furthermore, server device 100 transmits a NOTIFY message to reference person terminals 103 and 104 for temporarily releasing a Subscription and establishing the Subscription after a passage of a predetermined specified time (S2913 and S2914).

Herein, the NOTIFY message includes a "Subscription-Status" header and a "retry-after" parameter. In the NOTIFY message for temporarily releasing the Subscription and establishing the Subscription after a passage of a predetermined specified time, in the "Subscription-Status" header, "terminated" is set so as to instruct reference person terminals 103 and 104 to release the Subscription temporarily. Then, the "retry-after" parameter sets a specified time that is desired as a waiting time until server device 100 establishes the Subscription again.

Reference person terminals 103 and 104 that have received a NOTIFY message transmit a "200 OK" message (not shown) indicating that they have received the NOTIFY message to server device 100 and wait for the passage of the specified time set in "retry-after." Until the specified time set in "retry-after" has passed, the status of user device 105 is changed and a PUBLISH message notifying of the change of the status from user device 105 (S2915 and S2916). However, to reference person terminals 103 and 104 that release the Subscription, information notification is not carried out. To only reference person terminal 102 that does not release the Subscription, information notification is carried out (S2917 and S2918).

When server device 100 is in an overload state, which Subscription in reference person terminals 102, 103 and 104 should be temporarily released may be memorized and held in server device 100, for example, arbitrarily set or previously defined by a manager of server device 100.

Reference person terminals 103 and 104 transmit a SUBSCRIBE message to server device 100 after the specified time set in the "retry-after" has passed (S2919 and S2921). Server device 100 that has received the SUBSCRIBE message transmits a "200 OK" message (not shown) showing that it has received the SUBSCRIBE message to reference person terminals 103 and 104 and transmits a NOTIFY message setting the status of user device 105 at that time to reference person terminals 103 and 104 (S2920 and S2922).

When reference person terminals 103 and 104 receive a NOTIFY message from server device 100, they transmit a "200 OK" message (not shown) showing that they have received the NOTIFY message to server device 100, and, based on the received NOTIFY message, display the status information of user device 105 on a display or carry out the processing corresponding to the status information.

Reference person terminals 103 and 104 can explicitly recognize that notification is not carried out even if the status is changed in user device 105 until the time specified by the "retry-after" has passed. Therefore, even if server device 100 becomes in an overload state, it is possible to avoid discarding the notification of the change of the status without notification to reference person terminals 102, 103 and 104.

Thus, in accordance with this exemplary embodiment, it is possible to reduce a burst-like load even when server device 100 receives a large amount of PUBLISH messages for a short time.

Then, according to the priority level, importance and required immediacy of reference person terminals 102, 103 and 104, server device 100 can selectively control whether the Subscription of the information notification is once released or it is continuously maintained. Consequently, server device 100 can continue the information notification with respect to the reference person terminal (in this case, reference person terminal 102) that is important to receive the information notification while reducing the load. Thus, it is possible to prevent the service quality of the information notification from being deteriorated.

Furthermore, server device 100 detects an overload state, thereby when the Subscription is once released, according to the immediacy, importance, or the like, required by reference person terminals 102, 103 and 104, a value that is set in the "retry-after" can be controlled. Thus, it is possible to improve the balance between an effect of reducing the load to server device 100 and the real-time property of the status information notification. The value that is set in the "retry-after" for each reference person terminal can be arbitrarily set by a manager of server device 100 or previously determined and stored, and it may be held in server device 100.

Furthermore, in accordance with the exemplary embodiment of the eighth exemplary embodiments or later, priority levels are individually set in kinds of information received from user device 105 and information notification terminal 106, kinds of information transmitted to reference person terminals 102, 103 and 104, attribute information of reference person terminals 102, 103 and 104, and attribute information of user device 105 and information notification terminals 106 and 107, and the like. These exemplary embodiments respectively set the suspending time of information transmission according to the priority level. Furthermore, when reference person terminals 102, 103 and 104 receive another information during suspending, reference person terminals 102, 103 and 104 transmit the other information together with the information that is suspended to be transmitted. However, the present invention may combine two, three, or more of these configurations. This combination can increase the effect accordingly.

INDUSTRIAL APPLICABILITY

In the present invention, even when a large load is applied to the entire body of a device, information from a user device and an information notification terminal can be precisely transmitted to a reference person terminal without causing a delay or discarding and without gathering a plurality of pieces of information together. Therefore, the present invention is useful to a server device for notifying of the change of a status of a presence service and the like, or an information notification system, an information notification method, or the like.

The invention claimed is:

1. A messaging server device, comprising:
 a manager for receiving and managing a status of equipment or a user operating the equipment as status information, and detecting a load status of the messaging server device;
 a notification request receiver for receiving a notification subscription message from a reference person terminal subscribing a notification of the status information when a status change event occurs;
 a notification response transmitter for transmitting a notification response message responding to the received notification subscription message; and
 a status notification transmitter for transmitting a status notification message including the status information received by the manager to the reference person terminal, when the status change event occurs, once after receiving the notification subscription from the reference person terminal, in which transmission of the status notification message is limited according to the load status of the messaging server device,
 wherein:
 limiting the transmission of the status notification message according to the load status of the messaging server device includes suspending the transmission of the status notification message to the reference person terminal for a predetermined time when the manager detects an overload state of the messaging server device, wherein the reference person terminal does not receive the status notification message during the suspension, and transmitting the status notification message to the reference person terminal after a release of the suspension or discarding the status notification message after the release of the suspension, and
 as a predetermined suspending time of the status notification transmitter, the suspending time is set based on the level of the load status of the messaging server device.

2. The messaging server device of claim 1, wherein the manager detects the load status of the messaging server device according to at least one of a number of pieces of the received status information or a number of messages transmitted to the reference person terminal.

3. The messaging server device of claim 1, wherein the status notification transmitter transmits the status notification message to the reference person terminal when the manager detects an overload state of the messaging server device, the status notification message including an information request which requests the reference person terminal to transmit the notification subscription message after a passage of a predetermined time.

4. The messaging server device of claim 1, wherein the manager determines if the reference person terminal can relay data and instructs the reference person terminal to relay the status notification message to another reference person terminal when the reference person terminal can relay data.

5. A messaging server device, comprising:
 a manager for receiving and managing a status of equipment or a user operating the equipment as status information, and detecting a load status of the messaging server device;
 a notification request receiver for receiving a notification subscription message from a reference person terminal subscribing a notification of the status information when a status change event occurs;
 a notification response transmitter for transmitting a notification response message responding to the received notification subscription message; and a status notification transmitter for transmitting a status notification message including the status information received by the manager to the reference person terminal, when the status change event occurs, once after receiving the notification subscription from the reference person terminal, in which transmission of the status notification message is limited according to the load status of the messaging server device, wherein:

limiting the transmission of the status notification message according to the load status of the messaging server device includes suspending the transmission of the status notification message to the reference person terminal for a predetermined time when the manager detects an overload state of the messaging server device, wherein the reference person terminal does not receive the status notification message during the suspension, and transmitting the status notification message to the reference person terminal after a release of the suspension or discarding the status notification message after the release of the suspension, and the status notification transmitter further comprises an integrator for integrating a status notification message other than the suspended status notification message with the suspended status notification message when the status notification message is transmitted to the reference person terminal after the passage of the predetermined time which is based on the load status of the messaging server device.

6. The messaging server device of claim 5, wherein the manager detects the load status of the messaging server device according to at least one of a number of pieces of the received status information or a number of messages transmitted to the reference person terminal.

7. The messaging server device of claim 5, wherein the manager determines if the reference person terminal can relay data and instructs the reference person terminal to relay the status notification message to another reference person terminal when the reference person terminal can relay data.

8. An information notification method, comprising:

receiving and managing a status of equipment or a user operating the equipment as status information, and detecting a load status of a messaging server device;

receiving a notification subscription message from a reference person terminal subscribing a notification of the status information when a status change event occurs;

transmitting a notification response message responding to the received notification subscribing message; and transmitting a status notification message including the status information to the reference person terminal, when the status change event occurs, once after receiving the notification subscription from the reference person terminal, in which transmission of the status notification message is limited according to the load status of the messaging server device, wherein:

limiting the transmission of the status notification message according to the load status includes suspending the transmission of the status notification message for a predetermined time when an overload state of the messaging server device is detected, wherein the reference person terminal does not receive the status notification message during the suspension, and transmitting the status notification message after a release of the suspension or discarding the status notification message after the release of the suspension, and as a predetermined suspending time, the suspending time is set based on the level of the load status of the messaging server device.

9. The method of claim 8, further comprising detecting the load status of the messaging server device according to at least one of a number of pieces of the received status information or a number of messages transmitted to the reference person terminal.

10. The method of claim 8, further comprising transmitting the status notification message when an overload state is detected, the status notification message including an information request which requests transmission of the notification subscription message after a passage of a predetermined time.

11. The method of claim 8, determining, by the messaging server device, if the reference person terminal can relay data and instructs the reference person terminal to relay the status notification message to another reference person terminal when the reference person terminal can relay data.

12. An information notification method, comprising:

receiving and managing a status of equipment or a user operating the equipment as status information, and detecting a load status of a messaging server device;

receiving a notification subscription message from a reference person terminal subscribing a notification of the status information when a status change event occurs;

transmitting a notification response message responding to the received notification subscription message; and transmitting a status notification message including the status information to the reference person terminal, when the status change event occurs, once after receiving the notification subscription from the reference person terminal, in which transmission of the status notification message is limited according to the load status of the messaging server device, wherein:

limiting the transmission of the status notification message according to the load status includes suspending the transmission of the status notification message for a predetermined time when an overload state of the messaging server device is detected, wherein the reference person terminal does not receive the status notification message during the suspension, and transmitting the status notification message after a release of the suspension or discarding the status notification message after the release of the suspension, and integrating a status notification message other than the suspended status notification message with the suspended status notification message when the status notification message is transmitted after the passage of the predetermined time which is based on the load status of the messaging server device.

13. The method of claim 12, further comprising detecting the load status of the messaging server device according to at least one of a number of pieces of the received status information or a number of messages transmitted to the reference person terminal.

14. The method of claim 12, determining, by the messaging server device, if the reference person terminal can relay data and instructs the reference person terminal to relay the status notification message to another reference person terminal when the reference person terminal can relay data.

* * * * *